(12) United States Patent
Gasperini et al.

(10) Patent No.: US 12,173,543 B2
(45) Date of Patent: Dec. 24, 2024

(54) SPLIT STRUCTURE COUNTERBALANCE SYSTEM

(71) Applicant: Southco, Inc., Concordville, PA (US)

(72) Inventors: Christopher M. Gasperini, East Brunswick, NJ (US); Gregory S. Fosbenner, Sellersville, PA (US)

(73) Assignee: Southco, Inc., Concordville, PA (US)

( * ) Notice: Subject to any disclaimer, the term of this patent is extended or adjusted under 35 U.S.C. 154(b) by 617 days.

(21) Appl. No.: 17/432,355

(22) PCT Filed: Feb. 20, 2020

(86) PCT No.: PCT/US2020/019053
§ 371 (c)(1),
(2) Date: Aug. 19, 2021

(87) PCT Pub. No.: WO2020/172416
PCT Pub. Date: Aug. 27, 2020

(65) Prior Publication Data
US 2022/0170305 A1 Jun. 2, 2022

Related U.S. Application Data

(60) Provisional application No. 62/809,298, filed on Feb. 22, 2019.

(51) Int. Cl.
*B62D 25/12* (2006.01)
*E05F 1/10* (2006.01)
*E05F 1/12* (2006.01)

(52) U.S. Cl.
CPC ............ *E05F 1/1238* (2013.01); *B62D 25/12* (2013.01); *E05F 1/1033* (2013.01); *E05Y 2900/536* (2013.01)

(58) Field of Classification Search
CPC ...... B62D 33/067; B62D 25/10; B62D 25/12; E05F 1/123; E05F 1/1238; E05F 1/1033; E05Y 2900/536
(Continued)

(56) References Cited

U.S. PATENT DOCUMENTS 3,476,375 A 11/1969 Brasseur
4,571,775 A * 2/1986 Leonard ............... B60G 11/186
16/DIG. 36

(Continued)

OTHER PUBLICATIONS

International Search Report and Written Opinion for International Application No. PCT/US2020/019053, dated Aug. 8, 2020, 11 pages.
(Continued)

*Primary Examiner* — Gregory A Blankenship
(74) *Attorney, Agent, or Firm* — Buchanan Ingersoll & Rooney PC

(57) ABSTRACT

A counterbalanced system has first and second components e.g. vehicle panel pivotably connected to a vehicle. The counterbalanced system has a counterbalance assembly coupled to the first and second components. The counterbalance assembly includes at least one counterbalance subassembly having a cam secured to the first component, a cam bracket secured to the first second component, a bracket secured to the second component, and at least one torsion element extending between the cam bracket and the bracket. If two or more subassemblies are used, the torsion elements of each of the counterbalance subassemblies can extend along a common torsion axis or along parallel torsion axes spaced from a pivot axis. The counterbalance subassemblies are spaced from one another in a direction parallel to or along a common torsion axis. Each subassembly can be adjusted within a range of torque values. The counterbalanced system may comprise a hinge.

27 Claims, 19 Drawing Sheets

(58) Field of Classification Search
USPC .................................................. 296/190.07
See application file for complete search history.

(56) References Cited

U.S. PATENT DOCUMENTS

| | | | | |
|---|---|---|---|---|
| 4,589,164 A * | 5/1986 | Leonard | ............ | F16F 1/16 |
| | | | | 403/397 |
| 4,621,391 A * | 11/1986 | Leonard | ............ | E05F 1/123 |
| | | | | 16/306 |
| 4,670,940 A | 6/1987 | Leonard | | |
| 4,681,307 A | 7/1987 | Leonard | | |
| RE32,878 E | 2/1989 | Leonard | | |
| 5,664,289 A * | 9/1997 | Wolda | ............ | F16F 1/14 |
| | | | | 16/386 |
| 5,730,239 A * | 3/1998 | Holter | ............ | B62D 25/12 |
| | | | | 49/386 |
| 6,454,035 B1 * | 9/2002 | Waskow | ............ | B62D 25/10 |
| | | | | 180/69.21 |
| 6,494,280 B1 * | 12/2002 | Friend | ............ | E05F 1/1033 |
| | | | | 49/386 |
| 9,840,215 B2 | 12/2017 | Wubs | | |
| 2005/0067205 A1 * | 3/2005 | Watanabe | ............ | B62D 25/12 |
| | | | | 180/69.21 |
| 2008/0016651 A1 * | 1/2008 | Marsh | ............ | E05D 11/06 |
| | | | | 16/361 |
| 2008/0084087 A1 * | 4/2008 | Duffy | ............ | E05F 1/1215 |
| | | | | 296/76 |
| 2019/0368255 A1 * | 12/2019 | Schatz | ............ | E05F 15/611 |
| 2021/0172230 A1 * | 6/2021 | D'Allesandro | ....... | E05F 1/1058 |
| 2022/0170305 A1 * | 6/2022 | Gasperini | ............ | E05F 1/1033 |

OTHER PUBLICATIONS

International Preliminary Report on Patentability and Written Opinion for International Application No. PCT/US2020/019053, issued Aug. 10, 2021, 9 pages.

* cited by examiner

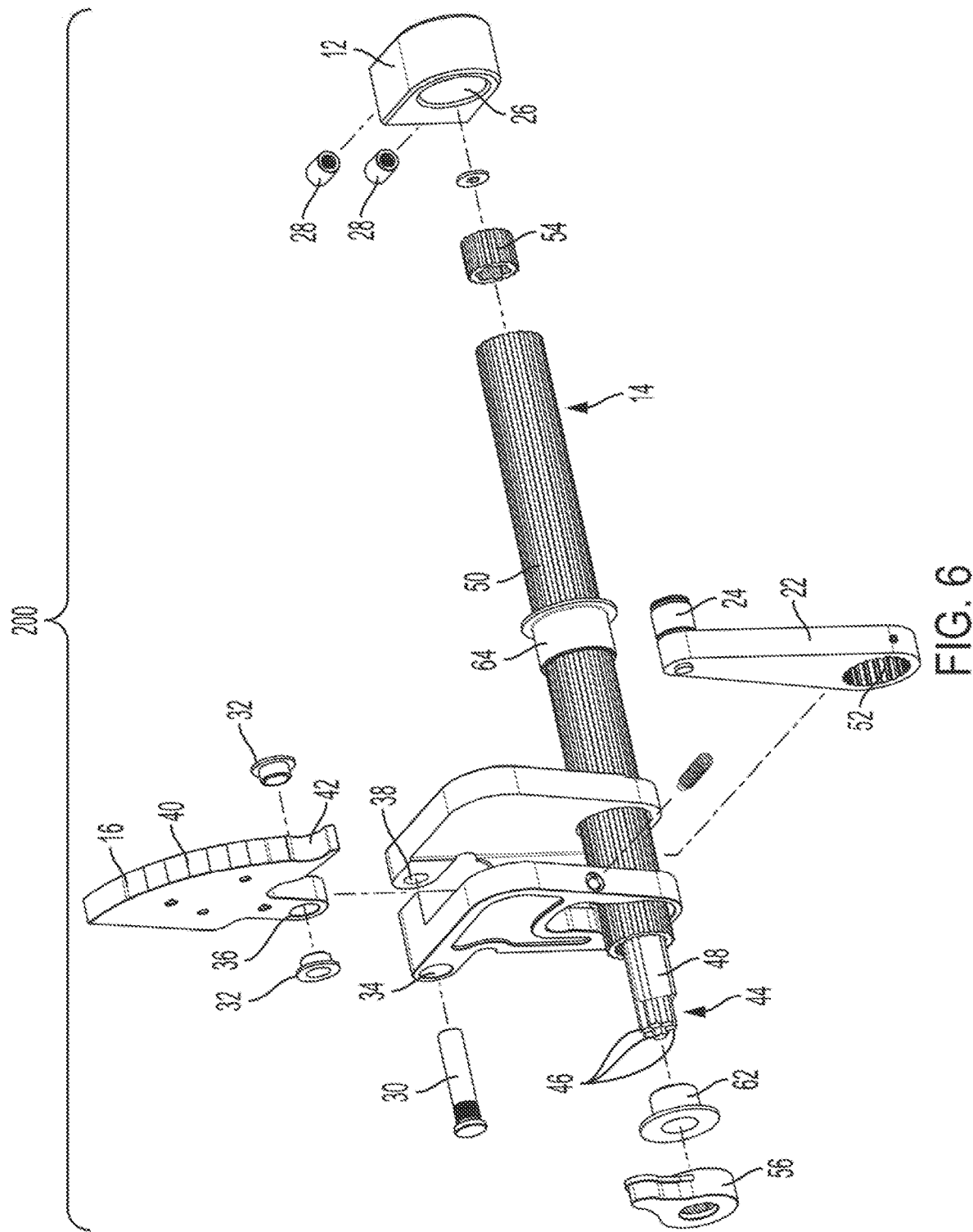

SPLIT STRUCTURE COUNTERBALANCE SYSTEM

CROSS REFERENCE TO RELATED APPLICATIONS

This is the U.S. National Phase application of PCT/US2020/019053, filed 20 Feb. 2020, which claims the benefit of priority from, U.S. Provisional Application No. 62/809,298, titled COUNTERBALANCE ASSEMBLY AND COUNTERBALANCED SYSTEM, filed 22 Feb. 2019, the contents of each of which are incorporated herein by reference in their entireties for all purposes.

BACKGROUND OF THE INVENTION

When managing the movement of two components with respect to one another, it is sometimes beneficial to employ a mechanism to counterbalance the components. U.S. Pat. Nos. 4,571,775; 4,589,164; 4,621,391; 4,670,940; 4,681,307; and RE32,878 disclose counterbalance devices and are incorporated by reference into this application for all purposes. Further improvements of counterbalance mechanisms are desired.

SUMMARY OF THE INVENTION

This invention provides an assembly configured to counterbalance components movable relative to one another as well as a counterbalanced system including such components. The assembly has a wide range of adaptability to various loads. The assembly is comprised of a plurality of sub-assemblies that may each be individually adjusted within a nominal load range. Moreover, two or more sub-assemblies each having different nominal load ranges may be used in the same counterbalance assembly.

According to one aspect of the invention, an assembly is configured to counterbalance components movable relative to one another, the assembly including first and second components connected to one another to pivot relative to one another about a pivot axis between a first position and a second position. The assembly also includes a counterbalance assembly coupled to the first and second components, the counterbalance assembly including a plurality of counterbalance subassemblies each having a cam secured to the first component, a cam bracket secured to the second component, a bracket secured to the second component, and at least one torsion element extending between the cam bracket and the bracket, the at least one torsion element of each of the counterbalance subassemblies extending along a subassembly torsion axis spaced from and parallel to the pivot axis. The counterbalance subassemblies of the counterbalance assembly are spaced from one another in a direction along the subassembly torsion axes, thereby defining a gap between the bracket of one of the counterbalance subassemblies and the bracket or the can bracket of another one of the counterbalance subassemblies.

According to optional aspects of the assembly, the means for exerting force can be a torsion element. Suitable such elements include torsion bars comprised of a plurality of separate shaped rods or stiff wires, concentric tubes, or flat plates. The assembly can include a cam profile and a cam follower. The cam profile can include a detent to hold the cam follower in one position, such as open or closed or some intermediate position. The follower can include a roller or another friction-reducing element.

According to another aspect of the invention, a counterbalanced system includes components movable relative to one another and at least one counterbalance assembly counterbalancing the components relative to one another. The at least one counterbalance assembly comprises at least two sub-assemblies. Each sub-assembly has a torsion element, a cam bracket coupled to one of the components, a follower arm pivotally coupled to the torsion element, a follower coupled to the follower arm, and a cam coupled pivotally coupled to the cam bracket and coupled to another one of the components in such a way that the cam follower contacts a cam profile of the cam. The at least one sub-assembly facilitates movement of the components relative to one another. The sub-assembly may also comprise a hinge point of the two components relative to each other.

According to optional aspects of the counterbalanced system, one of the components can be a vehicle panel. Also, the vehicle panel can include a vehicle hood.

BRIEF DESCRIPTION OF THE DRAWINGS

FIG. 6 is an exploded view of an embodiment of a counterbalance subassembly;

DETAILED DESCRIPTION OF THE INVENTION

Figure 1:
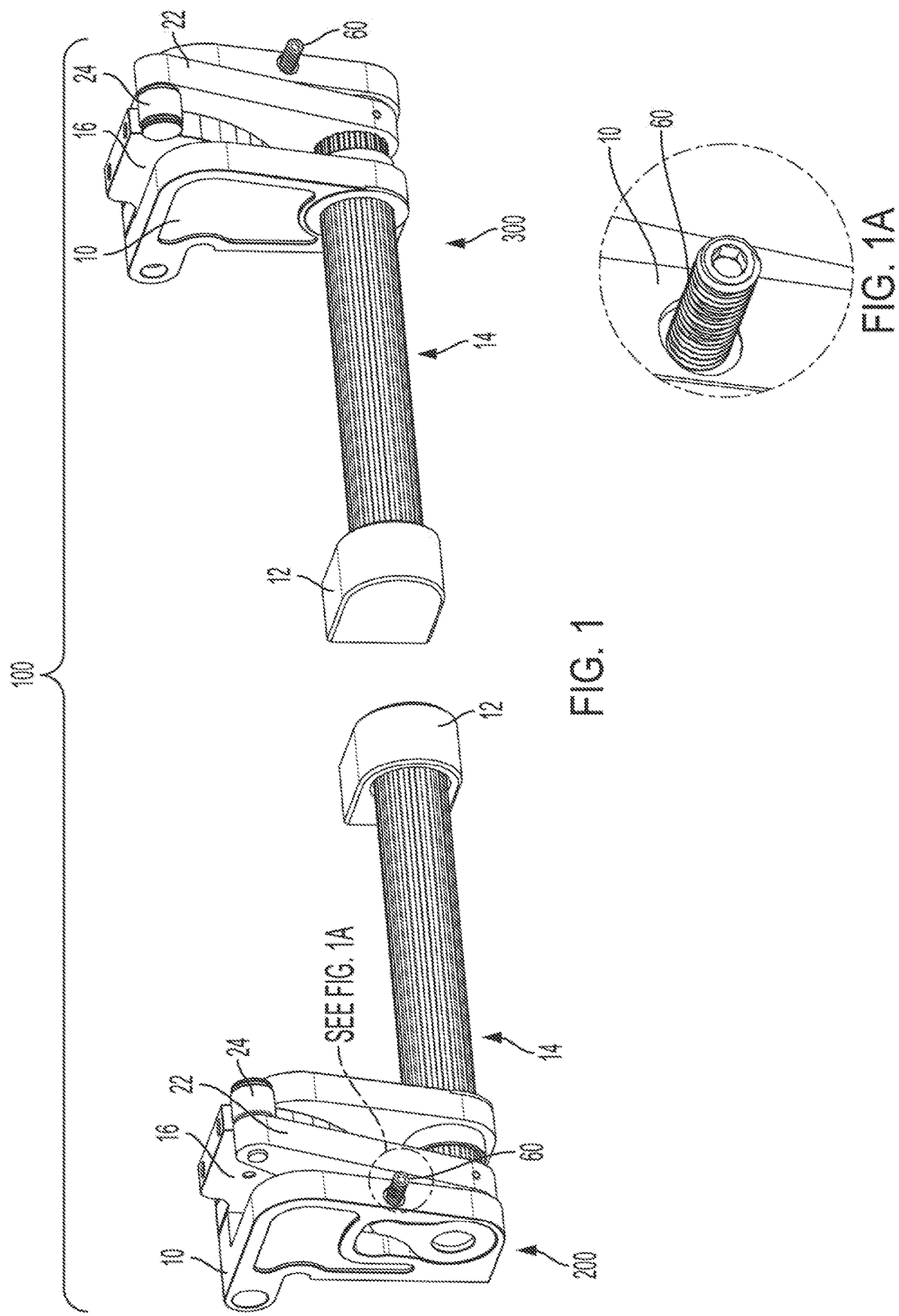
FIG. 1 is a perspective view of an exemplary embodiment of a counterbalance assembly in a first configuration.

Although the invention is illustrated and described herein with reference to specific embodiments, the invention is not intended to be limited to the details shown. Rather, various modifications may be made in the details within the scope and range of equivalents of the claims and without departing from the invention.

Generally, a counterbalance mechanism is provided by this invention, including embodiments that utilize a plurality of sub-assemblies utilizing a torsion element (or other torque generating device) acting on a follower arm in combination with a customizable cam profile generating a counter acting force to the center of gravity of a system (e.g., panel, such as a truck hood, a door, etc.). The amount of torque supplied by the torsion element can be easily adjusted within a range around a nominal amount of torque.

In one aspect of the invention, the mechanism is provided to counterbalance and/or provide a customizable torque to a system having multiple components. This is achieved by utilizing a customizable torque (i.e. rotational force) coupled to a follower and a cam that work in conjunction with the system, which applies a counteracting force to the weight of the system about its point of rotation. The hinge point of the system may be incorporated into the counterbalance mechanism.

Significant advantage is imparted by the ability of the system to be customized, both in terms of adjustability of the torque, but also because the counterbalance assembly can utilize at least two sub-assemblies that are mounted a distance apart, they allow other systems to be mounted between them. For instance, if the counterbalance assembly is mounted between a truck hood and the front of the truck frame (i.e. the hood would open by pivoting away from the windshield of the truck), the two subassemblies can be spaced apart such that a piece of auxiliary equipment, for instance a snowplow, can be mounted on the front of the truck between the two subassemblies. Since the torque supplied by each subassembly can be separately adjusted while the subassembly is mounted in place, it is easy to adjust the torque if necessary. For instance, if the hood is heavier on one side, or if for some reason the two subassemblies cannot be mounted symmetrically on the truck hood, each subassembly can be separately adjusted around a different range of torque outputs.

Further, the adjustability of the torque output can permit an end user to customize the operability of the system. As a non-limiting example, the system could store energy such that a panel, hood, door or other component could be locked closed, but when unlocked, automatically "pops" open, or slowly rises open. The system could also be adjusted such that a panel, hood, door, or other component could have a neutral balance point part way between fully open and fully closed, for instance. The system could also be adjusted such that the panel is neutrally balanced at any point, or indeed, all along its travel from open to closed, such that the panel effectively feels weightless all along its travel path. The system could also, for example, be adjusted such that it would automatically close at some point along the open/close path.

The counterbalance assembly, as shown and illustrated in various embodiments herein, utilizes a moveable cam attached to the rotating part of the system (e.g., a truck hood, a door, etc.), and the torque-generation part of the system is attached to a non-moving section of a system (e.g., a truck frame, a doorframe, etc.). It is to be understood that this arrangement is for illustrative purposes only and that the system can be mounted in the opposite orientation as well, i.e. the moveable cam could be mounted to the non-moving section of the system. Additionally, since the counterbalance assembly as a whole can be comprised of a plurality of sub-assemblies, they do not all have to be mounted in the same orientation, depending on the particular application.

In addition, depending on the particular geometry of the components, the torsion axes of the subassemblies do not have to be coaxial, although the torsion axes must be parallel to each other. An example of a situation where the two or more counterbalance subassemblies do not have coaxial torsion axes is a truck hood that has a "step" in the middle, so that half of the hood is a greater distance from the ground than the other half.

The counterbalance assembly, also referred to herein as an "assembly" is customizable, which means that depending on the particular design and adjustment of the torque elements, and the design of the cam profile, a panel (or other movable element) can be designed to open automatically or be partially or even perfectly counterbalanced (made to feel weightless throughout the motion). The moveable component of the system can thus be made to feel like any possibility of desired weight when moved.

The cam can be shaped to impart to the system the desired overall counterbalancing characteristics, such as, for example, a neutral counterbalancing. The cam design is optionally based on one or more of the mass that is being moved, the location of the torsion member relative to the hinge, the angular travel of the rotating member, and the output torque rate of the torsion member. Not only can the cam be shaped to produce any desired torsional response, but even a detent action can be obtained if desired by modifying the cam shape. Also, damping can be achieved by adding friction to the cam follower.

The sub-assemblies can also be mounted in the reverse configuration where the cam profile counterbalance would be fixed and the torque element would be attached to the rotating or movable part of the system. The system can also be designed to include a hinge or used in conjunction with a separate hinge system. The hinge for the system may be incorporated into the counterbalance assembly.

Furthermore, a counterbalanced system in which a single counterbalance subassembly is utilized in conjunction with a separate hinge is also contemplated as an embodiment of the counterbalanced system as described herein. In such an embodiment, the hinge is mounted a distance from the counterbalance subassembly, such that a defined gap exists between the counterbalance subassembly and the hinge. As discussed above, in this embodiments, as in the other embodiments, the hinge and assembly must have co-parallel pivot points.

If a hinge is utilized in conjunction with a counterbalance assembly or subassembly, the hinge itself can be a counterbalance subassembly or can include a counterbalance subassembly. In other words, the hinge can optionally be a counterbalance hinge. Accordingly, a hinge can be utilized that is a free-swing hinge, such as a hinge including a pin or shaft and one or more components rotatably coupled to the pin or shaft. For avoidance of doubt, such hinges that do not comprise a counterbalance mechanism are referred to herein at support hinges. Alternatively, a hinge can be utilized that incorporates a counterbalance mechanism such as, for example, the torsion bar system disclosed herein or a torque element system.

The counterbalance system is shown in accordance with one exemplary embodiment in the Figures. It should be understood that the counterbalance system can be utilized in a variety of applications. The counterbalance system may utilize a plurality of the counterbalance subassemblies or the counterbalance subassembly may utilize one counterbalance subassembly and a separate support hinge that does not comprise a torsion member or another counterbalance mechanism. Non-limiting examples of applications of the counterbalance system are panels, vehicle hoods, such as on trucks or cars, heavy doors or lids of containers or compartments, either in a vehicle or in other applications which require the use of heavy doors or covers that need to be periodically opened and closed, such as lids on a dumpster, bulkhead doors, etc. Also, this invention can be used for any application in which the perceived weight of a component is modified (decreased or increased) at any point along its movement relative to another component.

It should be also understood that a single application, for instance a truck hood, can utilize a plurality of the counterbalance subassemblies described herein in order to facilitate opening or closing the hood, although, as mentioned above, it is envisioned that it is possible for one of the subassemblies to be replaced with a support hinge or a support hinge system that does not include a torsion element. However, the following description is directed to an example where both subassemblies comprise a torsion element.

In the present example, the counterbalance assembly is described as if it is incorporated on a truck hood, in which the front of the hood when in the closed position is generally vertical, and when pulled open from the top or otherwise moved toward an open position, rotates to a more horizontal position, such that engine of the truck is accessible. In this example, the torque is provided by a torsion element that comprises a wire bundle and an exterior tube, but it can be appreciated by those with skill in the art that any such device (e.g., a member that is designed to provide torque) could also comprise a flat bar, a bundle of flat bars, or a coil torsion spring, as non-limiting examples.

Referring generally to the figures, and according to one aspect of the invention, FIG. 1 shows a perspective view of one embodiment of a counterbalance assembly 100. As can be seen in FIG. 1, the assembly 100 comprises two subassemblies; a first subassembly 200 and a second subassembly 300. As can appreciated by perusing FIG. 1, in this embodiment, first subassembly 200 and second subassembly 300 are mirror images of each other. Therefore, while the following Figures may each be arbitrarily focused on one or the other of the first subassembly 200 or second subassembly 300, a person having skill in the art can readily appreciate that the other of the first 200 or second subassembly 300 possesses the same parts and operates according to the same principles of operation as the other of the subassemblies 200 or 300, but is merely oriented in the opposite direction. The subassemblies 200 and 300 each comprise a cam bracket 10, a bracket 12, and a torsion element 14, which extends between the cam bracket 10 and the bracket 12, as well as a cam 16. The torsion elements 14 together can define a common torsion axis for the counterbalanced system. The subassemblies 200 and 300 do not both have to have the same torsion axis, but if they are not the same, the torsion axes of the subassemblies are preferably parallel. As can be seen in this embodiment, the first and second subassemblies 200, 300 are spaced apart from each other along a common torsion axis, which thus defines a gap between the first and second subassemblies 200, 300. Because these subassemblies 200 and 300 are mirror images of each other, the gap is between the brackets 12. If the subassemblies are identical, the gap would be between the bracket 12 of one subassembly 200 or 200 and the cam bracket 10 of the other subassembly 200 or 300. Further, mirror image subassemblies 200, 300 could be mounted such that the gap is between the cam brackets 10. Each first 200 and second subassembly 300 is seen to have a cam follower arm 22 secured to the torsion element 14. Attached to the cam follower arm 22 is a cam follower 24. As shown in this embodiment, the cam follower 24 comprises a roller rotatably attached to the cam follower arm 22.

Figure 2:
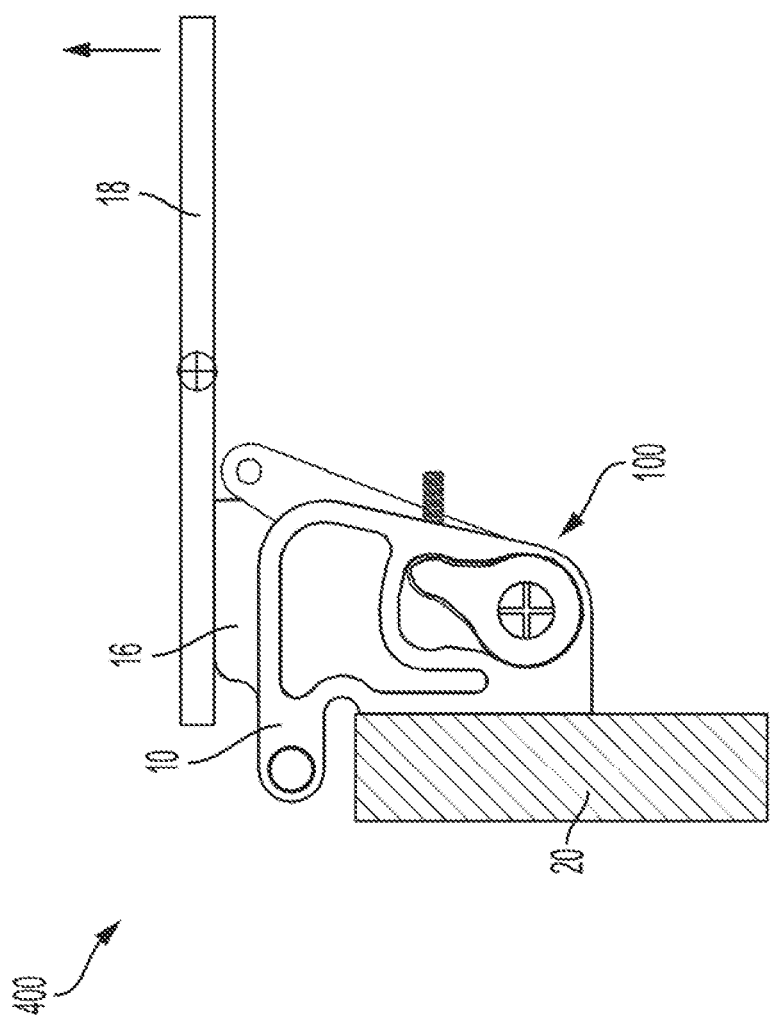
FIG. 2 is a side view of an embodiment of a counterbalanced system in a closed configuration.

Turning to FIG. 2, which shows a side view of a counterbalance assembly 100, as seen from the first subassembly 200 and in the closed position. As shown in FIG. 2, the cam 16 is secured to a first component 18 and the cam bracket 10 is secured to a second component 20. Although not visible in FIG. 2, the bracket 12 is likewise secured to the second component 20. The first component 18 and the second component 20 are rotatably connected to each other. In the case where the counterbalance assembly 100 is used in a vehicle, the first component 18 could be the hood and the second component 20 could be the frame of the vehicle. In this case, one can see that in FIG. 2, the component 18 (e.g. a hood) is in the closed position and it would move to the open position in the direction of the arrow. A person having skill in the art can readily appreciate that alternatively, the cam 16 could be secured to a vehicle frame and the cam bracket 10 could be secured to the hood. Furthermore, since the counterbalance assembly 100 comprises the first and second subassemblies 200 and 300, the cams 16 of the subassemblies do not all need to be attached to same of the first component 18 or the second component 20.

Figure 3:
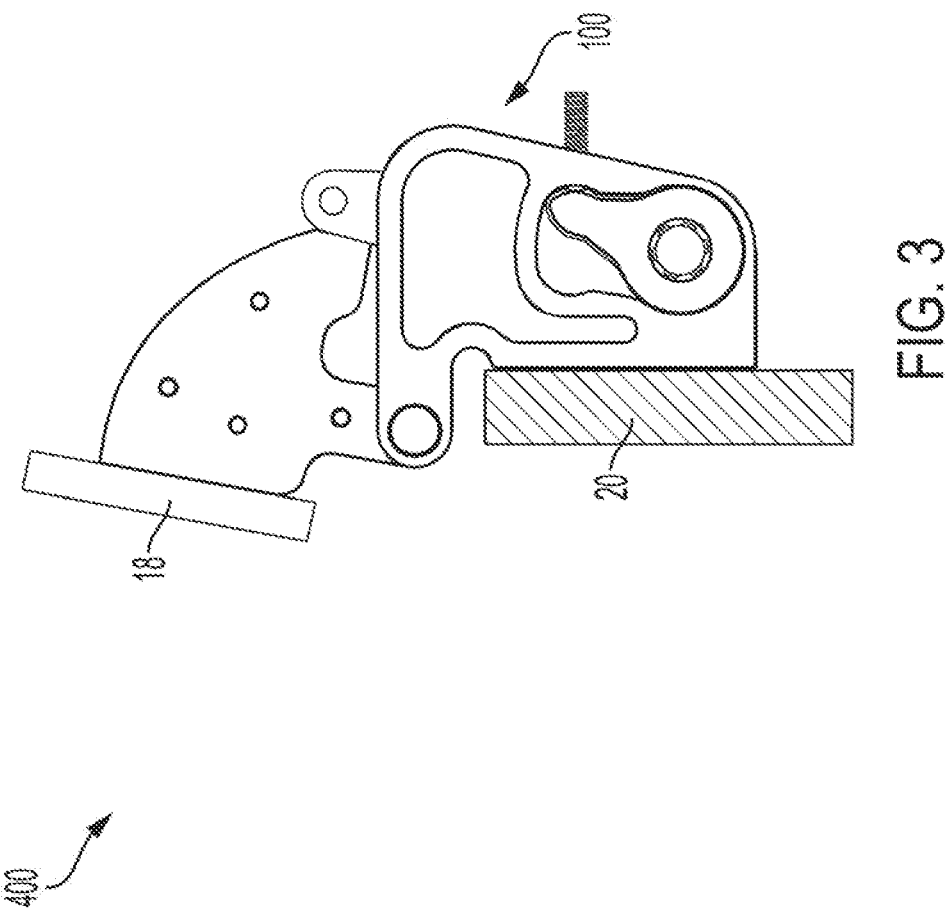
FIG. 3 is a side view of the counterbalanced system of FIG. 2 in an open configuration.

FIG. 3 shows a side view of a counterbalanced system 400 in the opened position, such that the first component 18 has been rotated upward.

Together, the first component 18, the second component 20, and the counterbalance assembly 100 comprise the counterbalanced system 400. The counterbalance assembly 100 may comprise at least one or at least two counterbalance subassemblies, or may comprise more than two counterbalance subassemblies. The counterbalanced system 400 may alternatively comprise at least one counterbalance subassembly and at least one support hinge. Such a counterbalanced system is shown, for example, in FIG. 20 and discussed in more detail below.

A person having skill in the art can appreciate that the plurality of the counterbalance assemblies 200 that comprise the counterbalance assembly 100 may be comprised of first 200 and a second 300 counterbalance assemblies, all first counterbalance assemblies 200, or all second counterbalance assemblies 300. As mentioned above, all of the counterbalance assemblies 200 and/or 300 do not have to be secured to the first and second components 18, 20 in the same orientation. Further, the counterbalanced system may include a support hinge that does not comprise a torsion element. The support hinge should have a pivot axis that is coaxial with the pivot axis of the subassembly. If at least one separate support hinge is included in the counterbalance system, then there may be one subassembly, rather than a plurality of subassemblies. A non-limiting example of such a counterbalanced system is shown in FIGS. 20-23 and described in more detail below.

Figure 5:
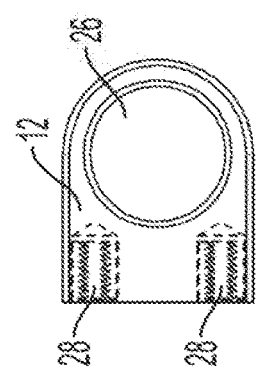
FIG. 5 is a side cross-sectional view of a component of a counterbalance subassembly.
Figure 4:
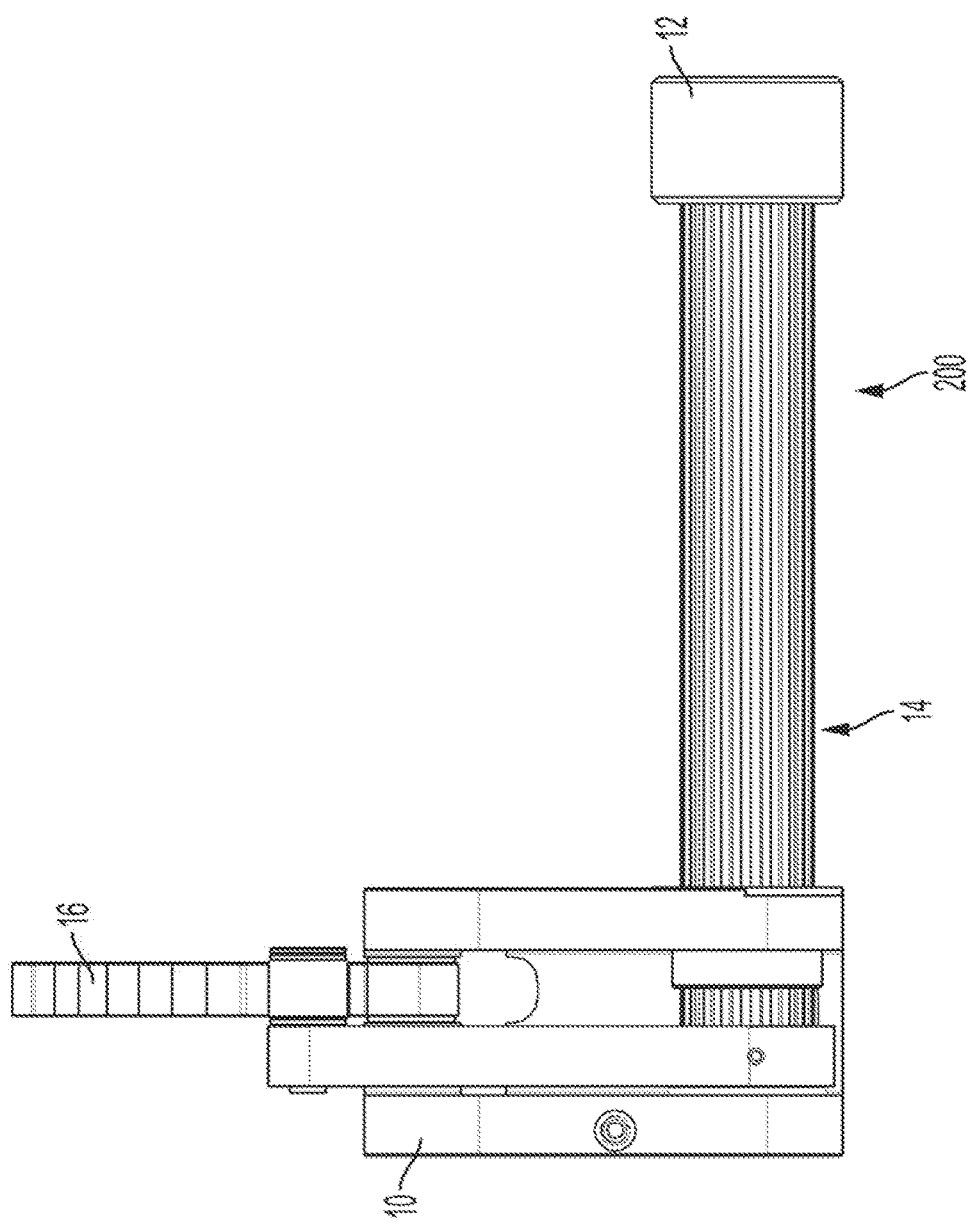
FIG. 4 is a front view of an embodiment of a counterbalance subassembly in the open configuration.

FIG. 4 shows a front view of the first subassembly 200 in the open position. In this view it can be seen that the cam 16 has been rotated away from the cam bracket 10. Also visible in the view is the torsion member 14 as well as the bracket 12. FIG. 5 shows a side cross-sectional view of the bracket 12. This view shows that the bracket 12 has receptacle 26 that is shaped to accept and secure the torsion member 14 to the second component 20 (not shown). Also shown in cross section are two threaded inserts 28. These are configured and arranged to accept fasteners (e.g. bolts or screws) that secure the bracket 12 to the second component 20.

Turn next to FIG. 6, which shows an exploded view of the first subassembly 200. As can be seen in FIG. 6, the cam 16 is rotatably secured into the cam bracket 10 with a hinge pin 30. The hinge pin 30 fits first into one of two cam bushings 32, then is inserted into a through hole 34 in the cam bracket 10, through another through hole 36 in cam 16 and into the other cam bushing 32 and then into receptacle 38 which is in the cam bracket 10 and located opposite the through hole 34 in the cam bracket 10. The receptacle 38 may be a through hole or it may be a cavity. This hinge pin 30 thus defines a pivot axis between the first component 18 and the second component 20. This pivot axis is therefore spaced apart from the torsion axis which is defined by the torsion element 14. Note that in this view the cam 16 is rotated upwards as if the first component 18 (not shown) was in the open position. Note also that cam 16 defines a cam profile 40, along which the cam follower 24 will travel when the first component 18 (not shown in FIG. 6) is rotated relative to the second component 20 (not shown in FIG. 6). It is clear from this view that there is a detent 42 in the cam profile 40. The detent 42 is configured to accept the cam follower 24 when the subassembly 200 is in the open position, thus temporarily holding the first component 18 in an open position and thus requiring additional input force to rotate the first component 18 to the closed position.

Other details of the first subassembly 200 are also shown in FIG. 6. The torsion member 14 in this embodiment comprises several components that act together to produce the torque that counterbalances the weight of the first component 18. At the very interior of the torsion member 14 is a wire bundle 44. In this embodiment the wire bundle 44 comprises three wires 46, arranged in a triangular pattern. The wires 46 preferably have a hexagonal cross section so that they nest closely together, but any such cross sectional geometry that allows the wires 46 to nest together is suitable. A person having skill in the art can appreciate that in other embodiments, the torsion member 14 may have a different geometry and/or differing numbers of wires 46 may be used, and the wires 46 may be arranged in other patterns. The design choice of these two variables, the number of wires and/or the geometry of the torsion member 14 do not affect the principle of how the system operates. Surrounding the wire bundle 44 is a spacer 48, such as a spacer formed from fishpaper or other appropriate material, for example. As shown in FIG. 6, the spacer 48 does not extend to the very ends of the wire bundle 44. Over the spacer 48 is a tube 50. The interior and the exterior of the tube 50 are splined. The exterior splines are configured so that they mesh with a correspondingly splined aperture 52 in the cam follower arm 22. The cam follower arm 22 is thus secured to the tube 50.

Figure 8B:
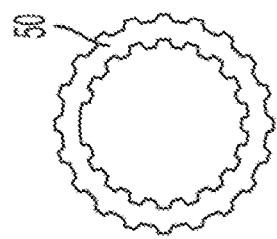
FIG. 8B is a side cross-sectional view of the component of a counterbalance subassembly shown in FIG. 8A.
Figure 7:
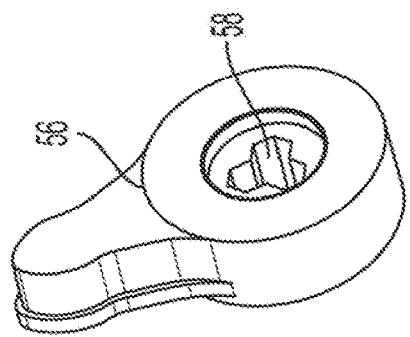
FIG. 7 is perspective view of a component of a counterbalance subassembly.
Figure 8A:
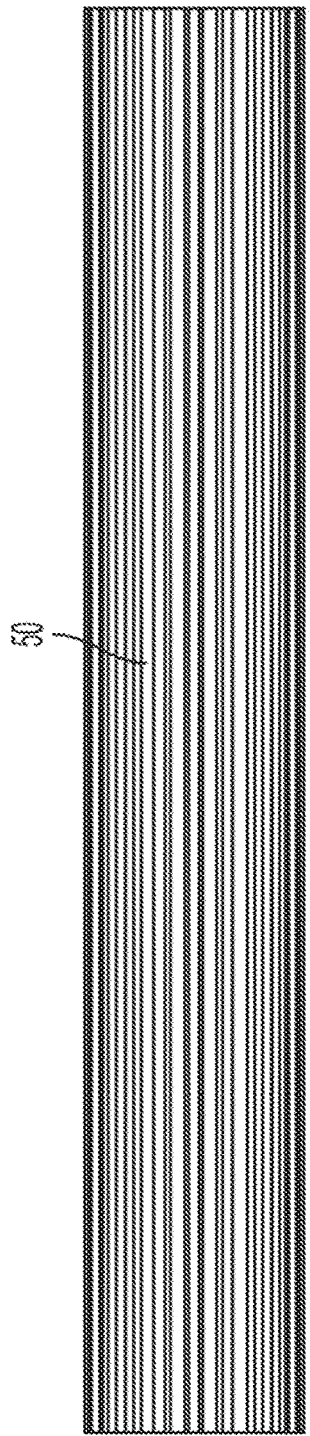
FIG. 8A is a front view of a component of a counterbalance subassembly.

The wire bundle 44 is secured at each end. At the end closest to the bracket 12, the wire bundle 44 is held with an inner socket 54. The inner socket 54 is configured to accept the wires 46 that comprise the wire bundle 44. Further, it can be seen that the outer surface of the inner socket 54 is splined. These outer splines on the inner socket 54 are configured to mesh with the interior splined surface of the tube 50. Thus, the wire bundle 44 is secured so that it cannot rotate relative to the tube 50 at the end closest to the bracket 12. At the end opposite the bracket 12, the wire bundle 44 is secured to an anchor arm 56. This end of the wire bundle 44 may optionally be covered, for example with an end cap (not shown). FIG. 7 shows a perspective view of the anchor arm 56, showing that it has an aperture 58 that is configured to accept the wire bundle 44. FIG. 8A illustrates a side view of the tube 50 and FIG. 8B is a cross-sectional view of tube 50, illustrating the splined outer and inner surfaces of tube 50.

Figure 9:
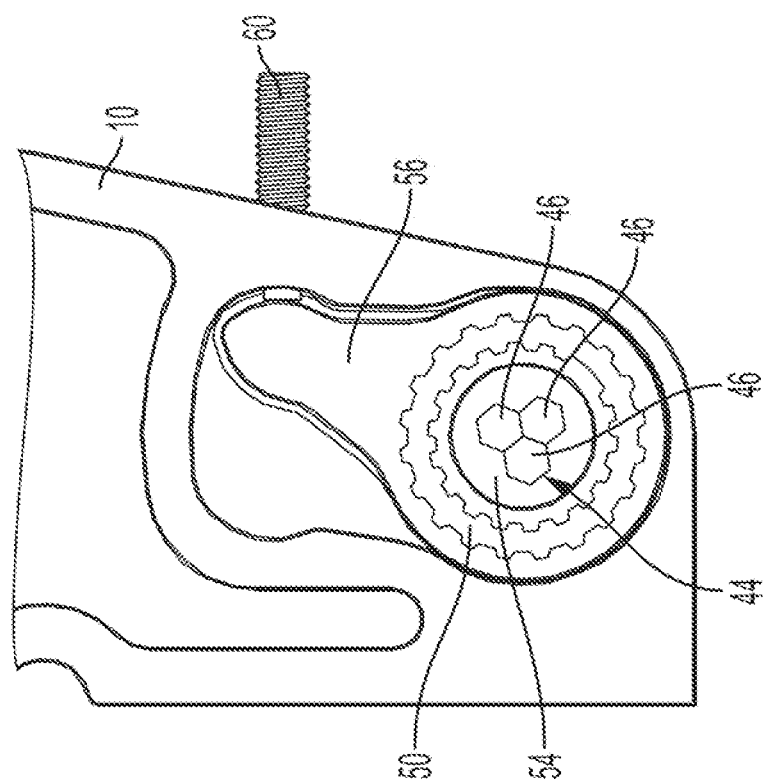
FIG. 9 is a partial side cross-sectional view of a portion of the counterbalance subassembly.

FIG. 9, which is a side view partial cross sectional view of assembly 200, shows the anchor arm 56, in place in the cam bracket 10. It can be seen in this side view that the end of the wire bundle 44 (comprising wires 46) is held in place at one end within the tube 50 via the inner socket 54 and at the other end the wire bundle 44 is held in place with respect to the anchor arm 56, due to the profile on the interior of the anchor arm, as seen in FIG. 7. Also shown in this side view in FIG. 9 is a set screw 60 that penetrates the cam bracket 10 and contacts the anchor arm 56.

Figure 10:
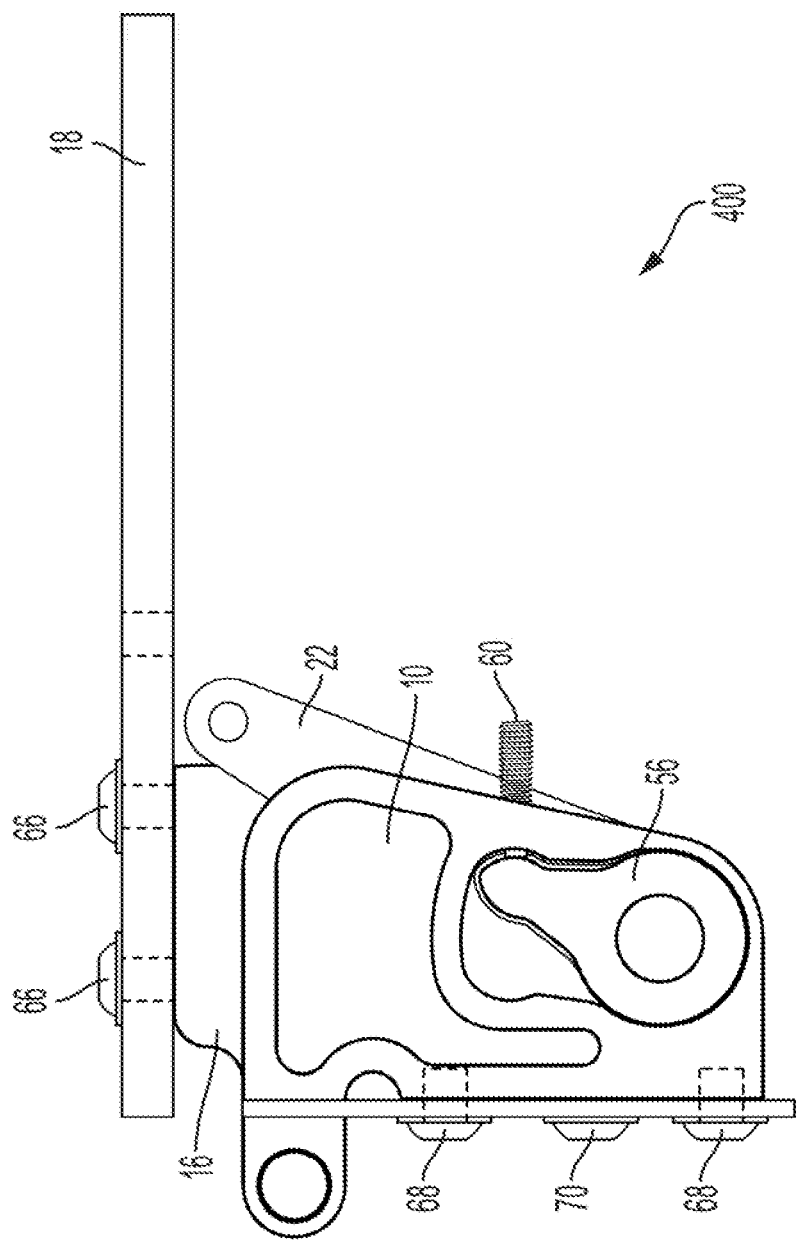
FIG. 10 is a side view of an embodiment of the counterbalanced system.

FIG. 10, which is a side view partial cross sectional view of either assembly 200 or 300, shows the anchor arm 56, in place in the cam bracket 10. Shown in this side view in FIG. 10 is the set screw 60 that penetrates the cam bracket 10 and contacts the anchor arm 56. Referring back to FIG. 1, the set screw 60 is shown in FIG. 1A as a close up as well. As can be appreciated by examination of FIG. 9 and FIG. 10, the set screw 60 can be set in or out of the cam bracket 10 which moves the anchor arm 56. The movement of the anchor arm 56 generates an initial preload on the wire bundle 44 (shown in FIG. 9). As the first component 18 rotates upwards or downwards, the cam 16 rotates and moves the cam follower 24 (not shown in FIG. 9) along the cam profile 40 (not shown in FIG. 9). The cam follower arm 22 and cam follower 24 rotate respectively and since the cam follower arm 22 is connected to the tube 50 via the splined aperture 52 in the cam arm 22, that rotation is transferred to the inner socket 54 inside of the tube 50 due to the internal spline of the tube 50. Since the end of the hex wire bundle 44 proximal to the anchor arm 56 (i.e. the end of the wire bundle 44 nearer the point where the wire bundle 44 attaches to the anchor arm) is fixed in position, the inner socket 54 twists the wire bundle 44 to generate variable torque, which increases and decreases with the change in twist.

Thus, the purpose of the spacer 48 is to maintain a constant active twist length of the wire bundle 44 during assembly and operation of the torsion member 14. During assembly, the wire bundle 44 is riveted, i.e. peened over on the ends to create an enlarged area that cannot slip out of the anchor arm 56 or the inner socket 54. However, it is possible that the inner socket 54 could slide down the wire bundle 44 in the tube 50 towards the anchor arm 56. Applying the rigid spacer 48 between the wire bundle 44 and the tube 50 keeps the inner socket 54 from sliding towards the anchor arm 56. Finally, note in FIG. 6 that there is a wire bushing 62 that serves as a bearing surface between the wire bundle 44 and the rotating tube 50. Likewise, there is a tube bushing 64, whose purpose is to protect the cam bracket 10 from the rotating tube 50 and to ensure concentric rotation of the tube 50.

Looking again at FIG. 10, shown in cross section, are fasteners 66 that secure the cam 16 to the first component 18, as well as fasteners 68 that secure the second component 20 to the cam bracket 10. Also visible is one of the fasteners 70 that secures the bracket 12 to the second component. Instead of fasteners, holes or apertures or other fastener structures, or structures to receive a fastener, may be provided in these locations.

Figure 11:
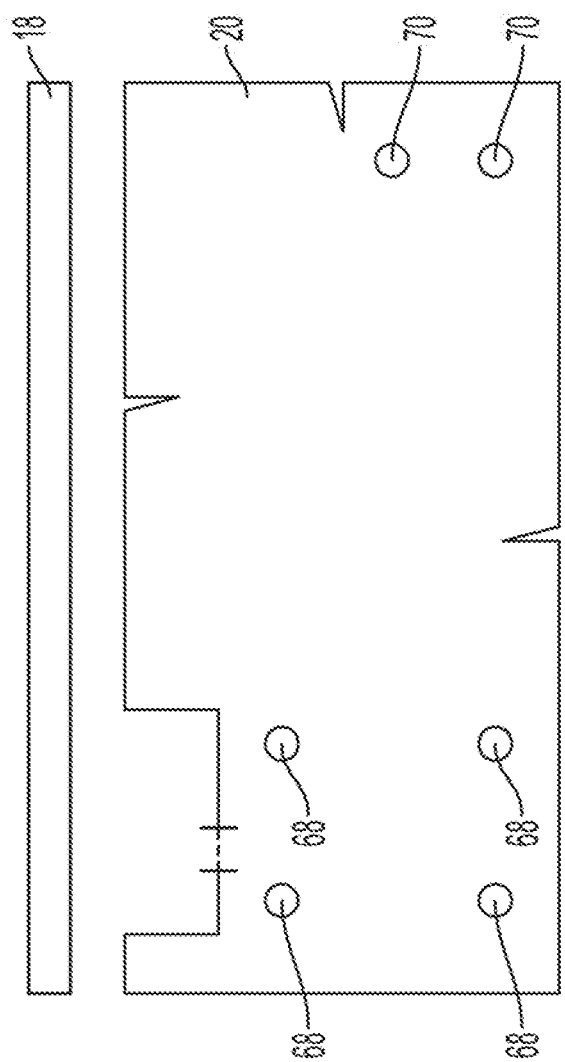
FIG. 11 is a partial front view of an embodiment of the counterbalanced system.

FIG. 11 shows a partial front view of an embodiment of the second component 20 and the edge of the first component 18, since the first component 18 is in the closed position. In this view the fasteners 68 that secure the cam bracket 10 to the second component 20 are shown, as well as the fasteners 70 that secure the bracket 12 to the second component 20.

Figure 12:
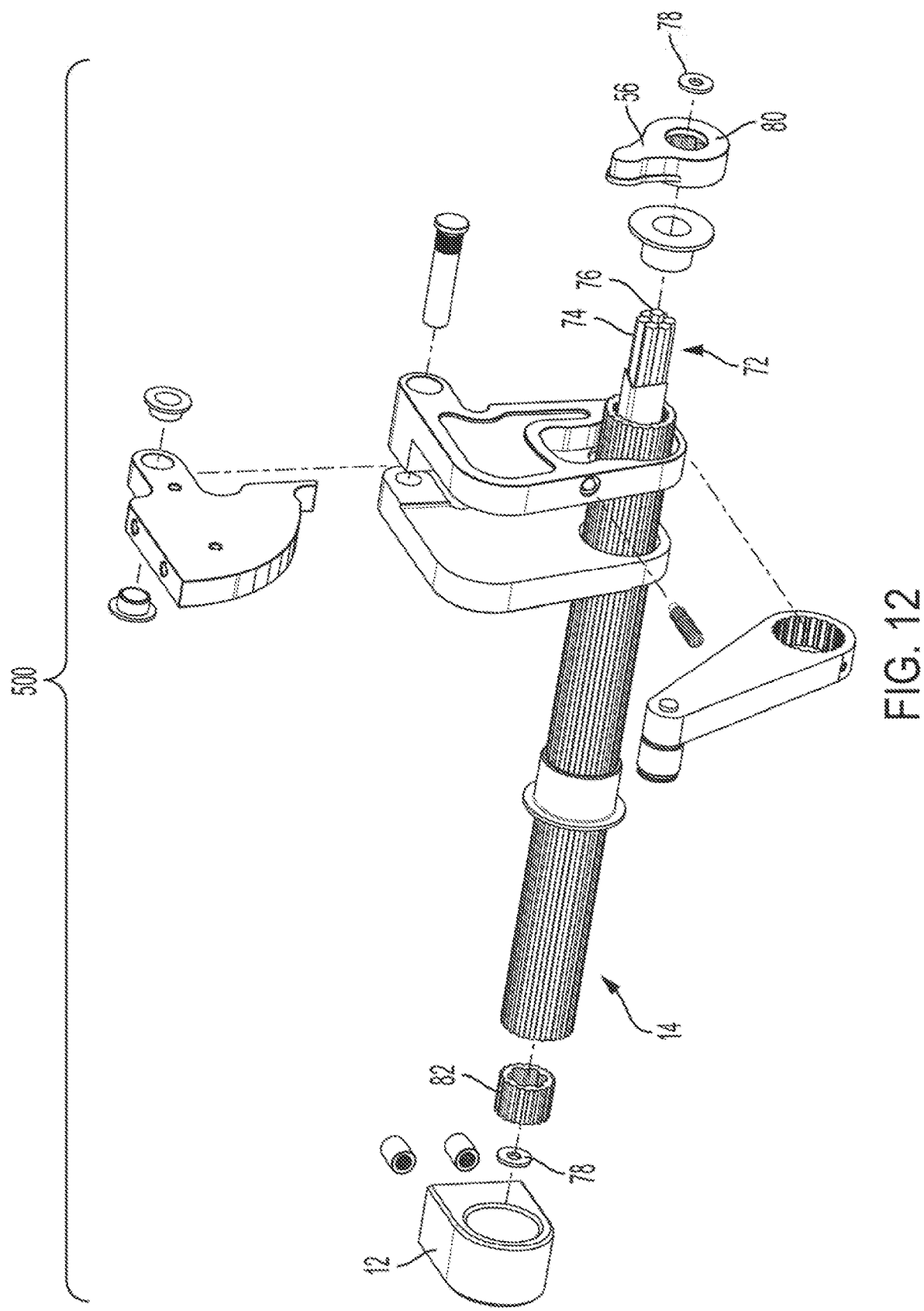
FIG. 12 is an exploded view of a second embodiment of a counterbalance subassembly.

FIG. 12 is an exploded view of a second embodiment subassembly 500. As can be seen, the second embodiment subassembly 500 is illustrated as a mirror image of the first subassembly 200, i.e., it is analogous to second subassembly 300. The overall difference between this embodiment and the first and second subassemblies 200 or 300 described above, is that this embodiment can produce a higher torque. Therefore, as will be described below, the difference is that this second embodiment 500 has more wires in the wire bundle, and a washer is used to prevent the inner socket and the anchor arm from sliding down the wire bundle. This second embodiment subassembly 500 operates according to the same principles as the subassemblies 200/300 and therefore comprises almost all of the same parts. For parts that are the same, the same part numbers will be used.

A person having skill in the art can comprehend that the counterbalance assembly 100 can comprise a plurality of subassemblies that all produce the same torque and have the same "handedness", i.e. are not mirror images, or the plurality of subassemblies may comprise two subassemblies that are mirror images of each other but each produces a different torque, or combinations of both "handedness" and torque level.

As mentioned above, this second embodiment 500 differs from the first embodiment 200 or 300 in the number of wires in the wire bundle, and therefore there are several slight geometrical differences in the parts that connect to the wire bundle and the method of securing the wire bundle to the inner socket and the anchor arm. Generally, the following description will focus on the differences between these two embodiments.

In FIG. 12, which is an exploded view of the second embodiment subassembly 500, it can be seen that the torsion element 14 has in its center a wire bundle 72. This wire bundle 72 is comprised of seven wires which are arranged in a pattern of six outer wires 74 and a single inner wire 76. All of these wires 74 and 76 are preferably hex-shaped so that they nest closely together in the wire bundle. Looking closely at FIG. 12, it is apparent that the inner wire 76 is slightly longer than the outer wires 74. Like the first embodiment wire bundle 44, which has only three wires, this second embodiment wire bundle 72 must be riveted (i.e. peened) over on the ends to create an enlarged area that cannot slip out of the anchor arm 56 at the cam bracket 10 end or out of an inner socket 82 at the bracket 12 end. With the heavy duty (7 wire model), when the wire bundle 72 is riveted all together, the center wire 76, would not be affected enough by the riveting process to prevent the wire bundle 72 from being able to disassemble. For this reason the center wire 76 is longer, and a hex washer 78 is placed on each end of the longer center wire 76 and only the center wire 76 is riveted, which captures the other six wires 74 beneath the washer 78 and mitigates the risk of unintended disassembly from either or both of the anchor arm or inner socket. This end of the wire bundle 72 may optionally be covered, for example with an end cap (not shown).

Figure 13:
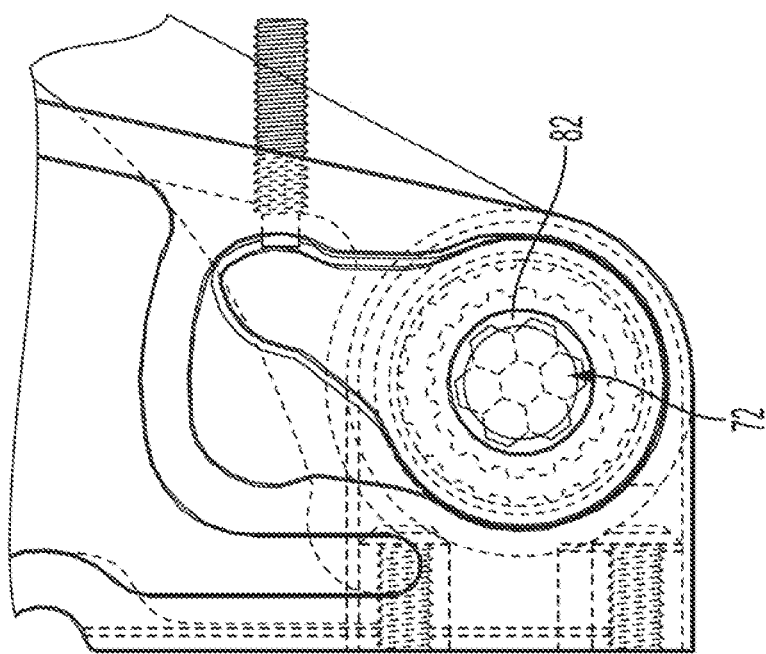
FIG. 13 is a partial side cross-sectional view of a portion of the second embodiment of the counterbalance subassembly.

Since the wire bundle 72 in this second embodiment has a different cross-sectional profile due to having more wires, the anchor arm 56 likewise has a different aperture 80 to match. This can be seen in cross section in FIG. 13. Also visible in FIG. 13 is the cross sectional view of a second embodiment inner socket 82. This second embodiment inner socket 82 has an inner profile that matches the profile of the wire bundle 72, and the inner socket 82 has an outer profile that matches the inner splined profile of the tube 50, thereby serving to secure together the wire bundle 72 to the tube 50.

Figure 14:
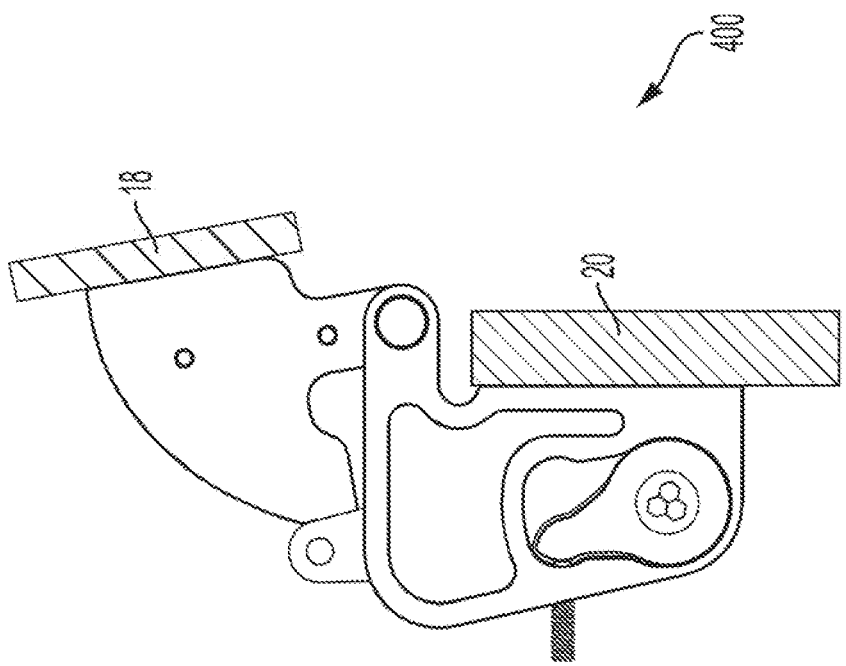
FIG. 14 is a side view of an embodiment of the counterbalanced system in the open configuration.
Figure 16:
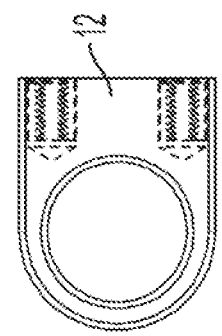
FIG. 16 is a side cross-sectional view of a component of a counterbalance subassembly.
Figure 15:
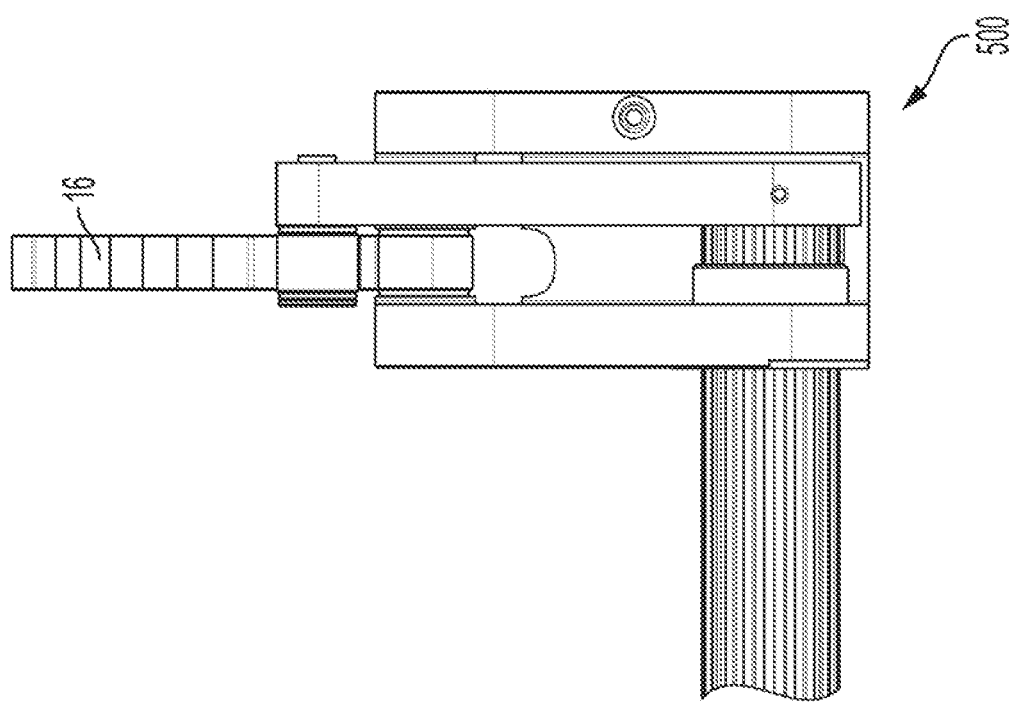
FIG. 15 is a front view of a second embodiment counterbalance subassembly in the open configuration.
Figure 17B:
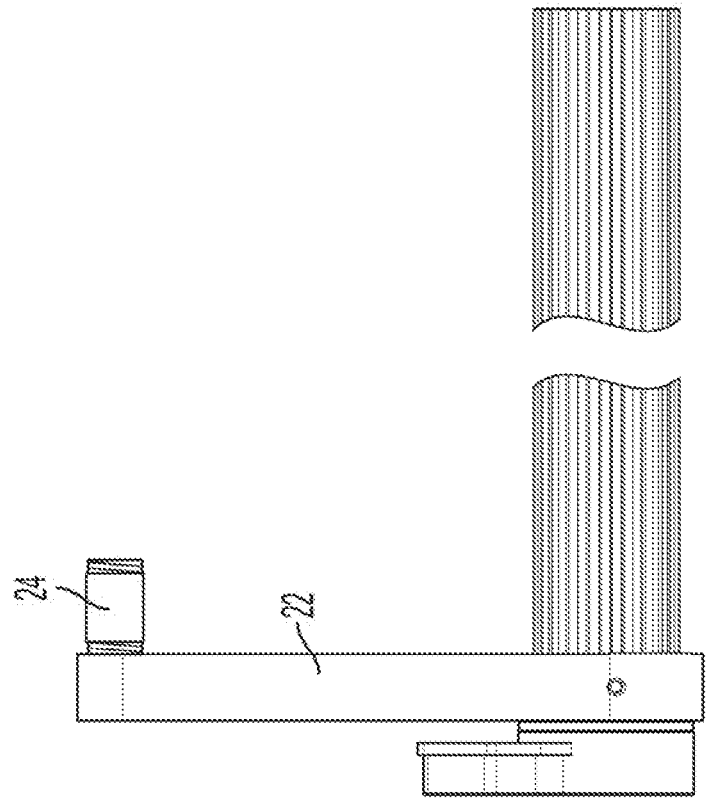
FIG. 17B is a partial front view of an embodiment of the counterbalance subassembly in the closed position.
Figure 17A:
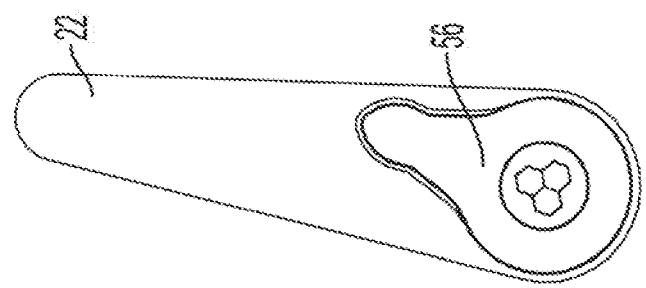
FIG. 17A is a side view of a portion of an embodiment of the counterbalance subassembly in the closed position.
Figure 19:
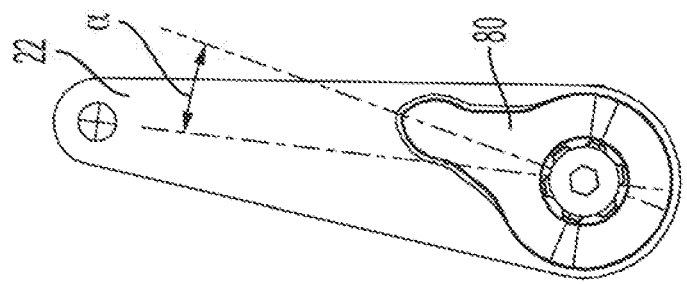
FIG. 19 is a side view of a portion of an embodiment of the counterbalance subassembly.
Figure 18:
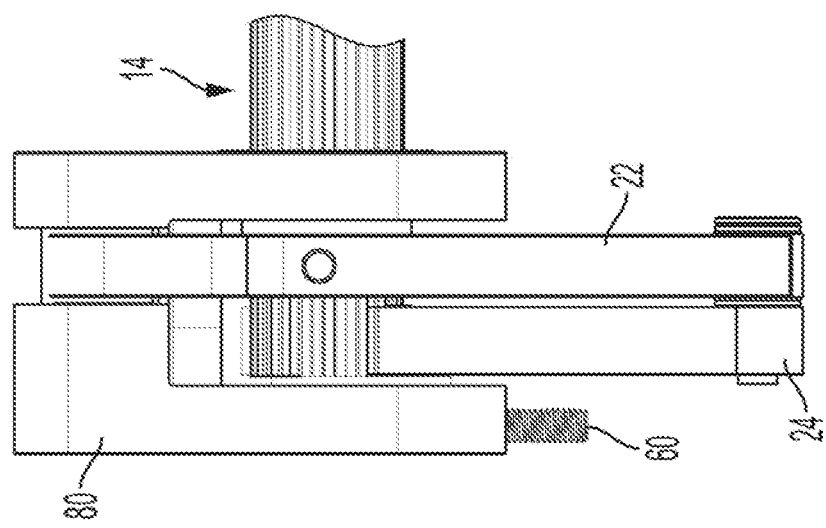
FIG. 18 is a partial top view of an embodiment of the counterbalance subassembly.

FIG. 14 shows a side view of either this second embodiment subassembly 500 or subassembly 300 in the opened position, such that the first component 18 has been rotated upward. Note that this view is essentially a mirror image of FIG. 3. FIG. 15, likewise shows a front view of the second embodiment subassembly 500 in the opened position such that the cam is rotated up away from the torsion element 14. FIG. 16 shows a side cross sectional view of the bracket 12 that secures the torque member 14 of the subassembly 500 to the second component 20. FIG. 17A is a side view of the cam follower arm 22 with the anchor arm 56 in place and 17B shows a partial front view of the anchor arm 56 and torsion member 14 of the subassembly 300. FIG. 19 shows a partial top view of cam bracket 10, anchor arm 80 and torsion member 14 of the subassembly 500. Also visible in FIG. 19 is the set screw 60, as well as the cam follower arm 22 and the cam follower 24.

Figure 20:
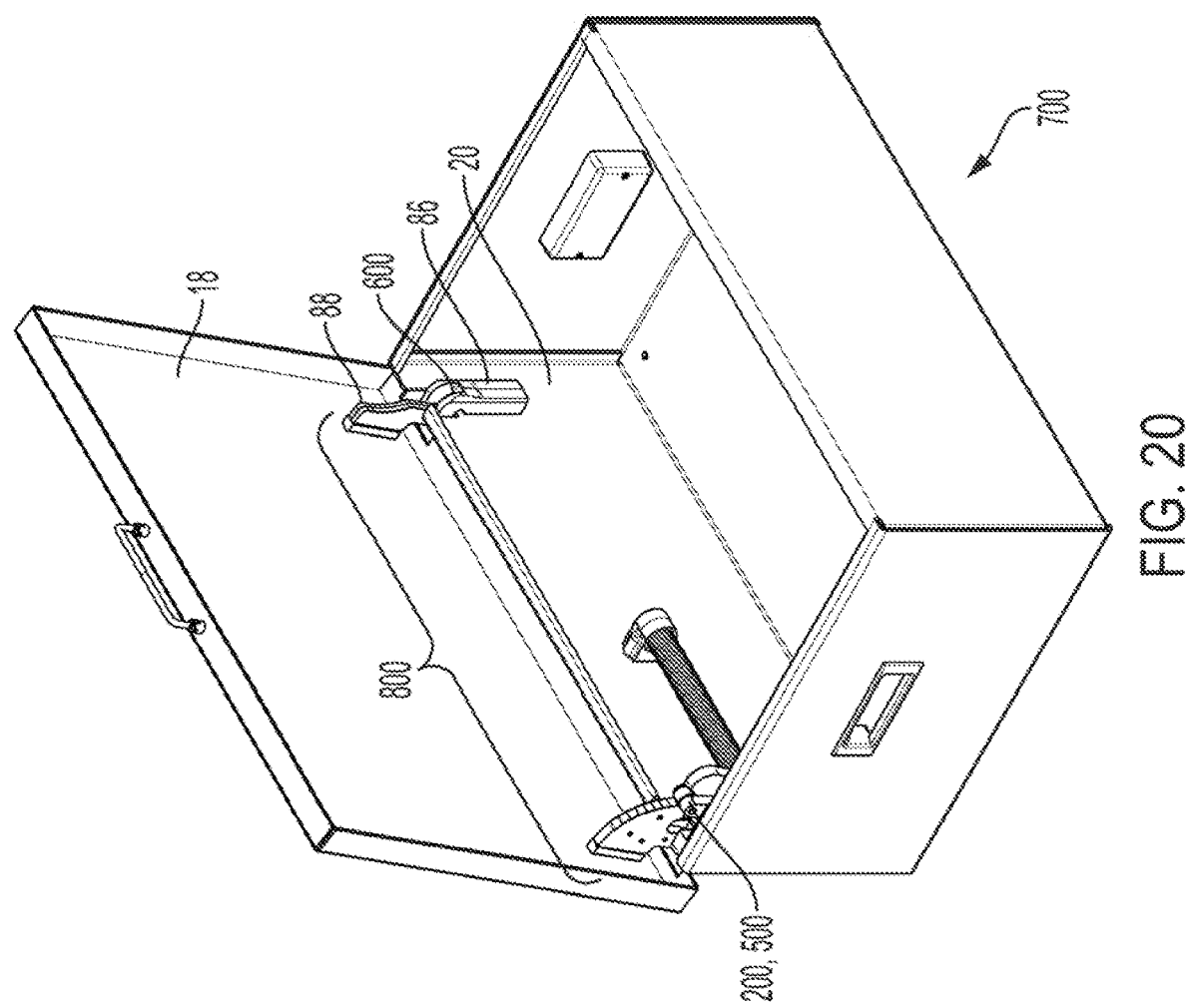
FIG. 20 is a perspective view of another embodiment of a counterbalanced system including a counterbalance assembly.
Figure 21:
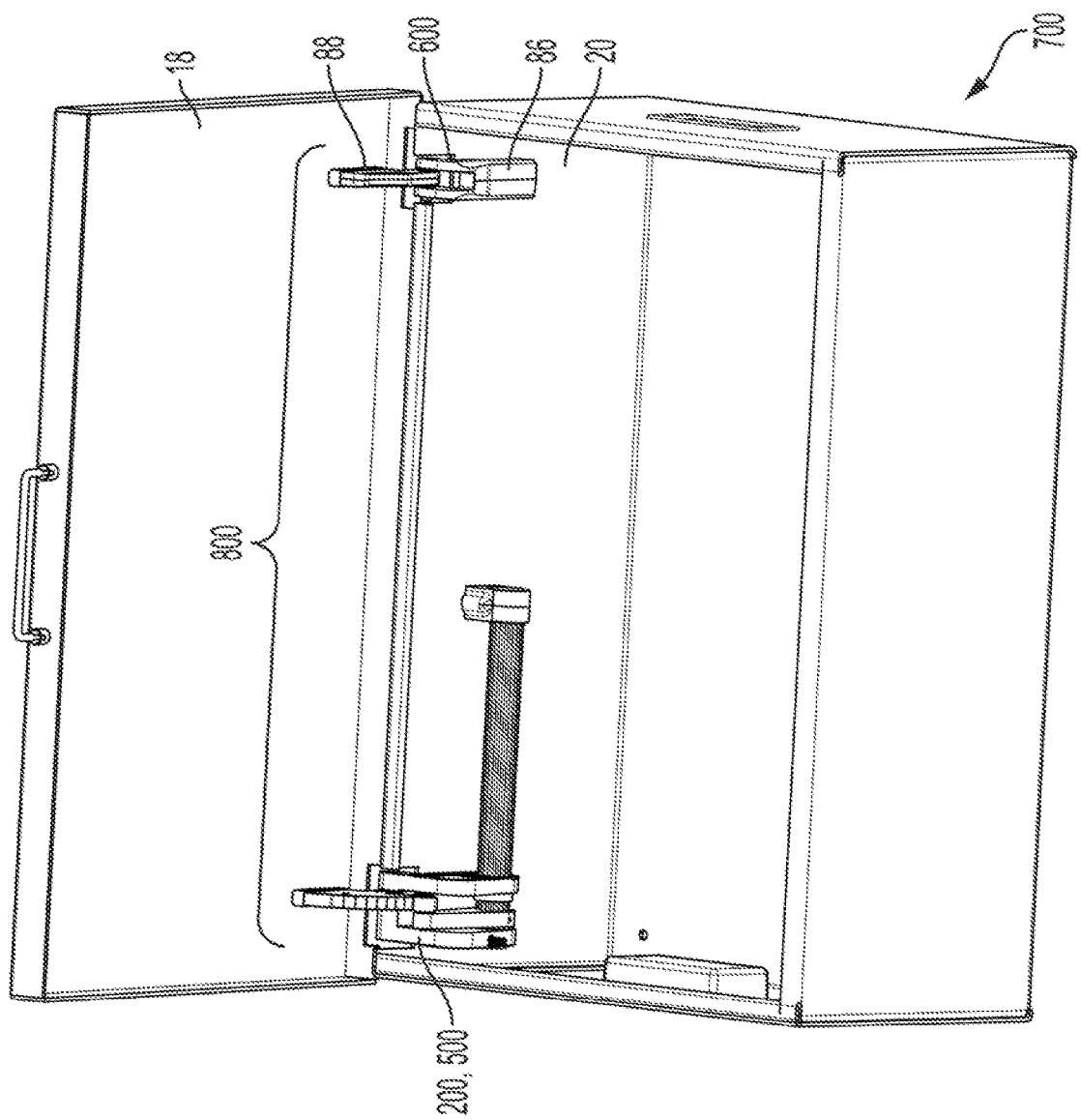
FIG. 21 is a another perspective view of the counterbalanced system illustrated in FIG. 20.

FIGS. 20 and 21 show another exemplary embodiment of a counterbalanced system 700. This embodiment of the counterbalanced system 700 comprises another embodiment of a counterbalance assembly 800 comprising a support hinge 600 and a counterbalance subassembly, which may be counterbalance subassembly 200 or 500 that is attached between the first component 18 and the second component 20. As depicted in this embodiment, the first component 18 is a lid of a box or housing or enclosure, and thus the second component 20 is shown as a sidewall of the box or housing or enclosure.

As shown in FIGS. 20 and 21, the counterbalance assembly 800 may further comprise the support hinge 600, which is attached to the first component 18 and the second component 20. As shown in FIGS. 20 and 21, the support hinge 600 is constructed and arranged to be capable of being attached to the first component 18 and the second component 20 at a distance from the counterbalance assembly 200 or 500. The support hinge 600 has a rotation axis in common with the rotation axis of the counterbalance assembly 200, 500. The support hinge 600 may be constructed and arranged to be capable of supporting at least some of weight of the first component 18, in particular when the first component is rotated downwards as if to close the box that comprises the first component 18 and second component 20.

The support hinge 600 may be, for example, a free-swing hinge that comprises an attachment bracket 86 attached to second component 20 and a hinge bracket 88 attached to the first component 18. Other non-limiting examples of suitable types of support hinges are friction hinges, and spring loaded hinges.

Figure 22:
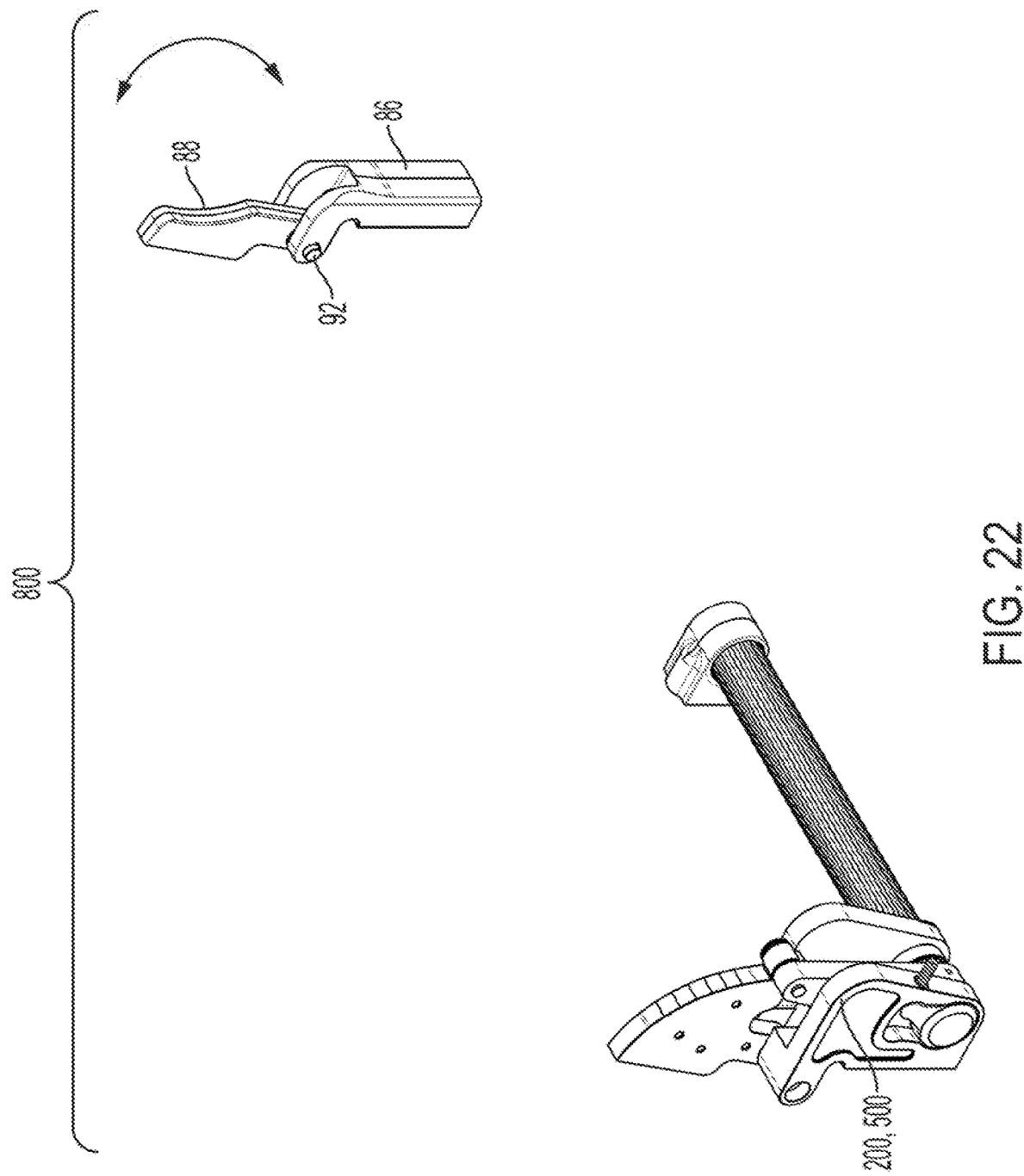
FIG. 22 is a perspective view of the counterbalance assembly of the counterbalanced system illustrated in FIG. 20.

FIG. 22 shows a perspective view of the support hinge 600, as well as the attachment bracket 86, the support hinge bracket 88, and a support hinge pin 92. The support hinge pin 92 is constructed and arranged to rotatably connect the attachment bracket 86 to the support hinge bracket 88, such that the attachment bracket 86 may be rotated or pivoted around the support hinge pin 92, as shown by the double ended arrow in FIG. 21.

The support hinge pin 92 may coincide with the rotation axis of the support hinge 600 and thus coincide with the rotation axis of the counterbalance assembly 200, 500 of the counterbalanced system 700. The attachment bracket 86 may be attached to the second component 20 with any suitable releasable or permanent fasteners, for example, screws or rivets or adhesive. Likewise, the attachment bracket 88 may be attached to the first component 18 with any suitable releasable or permanent fasteners, for example, screws or rivets or adhesive.

Figure 23:
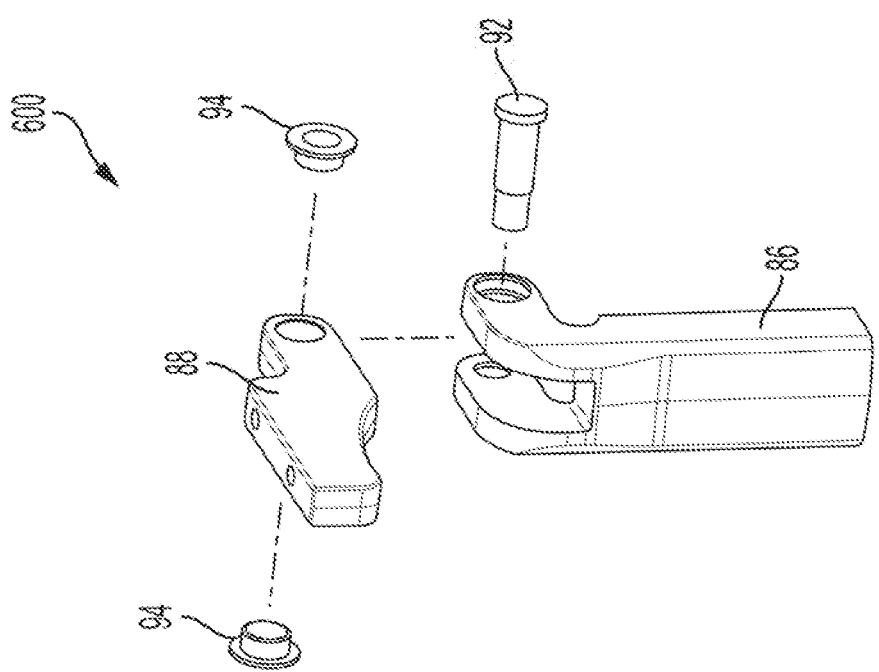
FIG. 23 is an exploded view of a portion of the counterbalance assembly illustrated in FIG. 22.

FIG. 23 shows an exploded view of the support hinge 600. In this view, two pin bushings 94 are shown, in addition to the support hinge pin 92, the attachment bracket 86, and the support hinge bracket 88. It will be appreciated that the configuration and components of the support hinge 600 may be varied to provide pivotal or other translation or movement between the components of the enclosure.

Adjustability of Torque Output

As alluded to above, the amount of torque produced by each counterbalance subassembly is customizable and depends on the amount of preload that is put into the wire bundle by the anchor arm.

The twist of the wire bundle produces the torque that counterbalances the weight of the first component as it is rotated from the closed position to the open position. Therefore, the amount of torque that is produced can be changed by altering the amount of pre-twist that is introduced into the wire bundle. A greater amount of pre-twist will produce more torque.

The preload can be described by the angle α between the cam follower arm 22 and the anchor arm 80, as shown in FIG. 19. This angle α is the position of the anchor arm 80, relative to the cam follower arm 22 when the first component 18 is in the open position. As described above, this angle α can be changed by movement of the set screw (not shown in FIG. 19). Note also that while FIG. 19 illustrates the set-up angle α with the second embodiment anchor arm 80, the same principle applies to first embodiment anchor arm 56.

Since the amount of twist in the wire bundle together with the particular geometry of the torque member are related to the torque generated by each particular subassembly, it can be appreciated that the torque can be adjusted conveniently by adding or subtracting twist from the wire bundle in the torsion member by the action of the set screw on the anchor arm which is secured to the wire bundle. In this way a nominal, or average torque can be provided by the selection of the wire bundle, as well as the initial amount of twist, and then the torque produced can be adjusted by use of the set screw, which adjusts the amount of twist within a range.

Various non-limiting aspects of the invention may be summarized as follows:

Aspect 1: A counterbalanced system 400, 700 comprising:
first 18 and second 20 components connected to one another to pivot relative to one another about a pivot axis between a first position and a second position; and
a counterbalance assembly 100, 800 coupled to the first 18 and second 20 components, the counterbalance assembly 100, 800 including a plurality of counterbalance subassemblies 200, 300, 500 each having a cam 16 secured to the first component 18, a cam bracket 10 secured to the second component 20, a bracket 12 secured to the second component 20, and at least one torsion element 14 extending between the cam bracket 10 and the bracket 12, the at least one torsion element 14 of each of the counterbalance subassemblies 200, 300, 500 extending along a subassembly torsion axis spaced from and parallel to the pivot axis;
wherein the counterbalance subassemblies 200, 300, 500 of the counterbalance assembly 100 are spaced from one another in a direction along the subassembly torsion axes, thereby defining a gap between the bracket 12 or the cam bracket 10 of one of the counterbalance subassemblies 200, 300, 500 and the bracket 12 or the cam bracket 10 of another one of the counterbalance subassemblies 200, 300, 500.

Aspect 2: The counterbalanced system 400, 700 of Aspect 1, wherein the subassembly torsion axes are aligned along a common subassembly torsion axis.

Aspect 3: The counterbalanced system 400, 700 of Aspect 1 or Aspect 2, each of the counterbalance subassemblies 200, 300, 500 of the counterbalance assembly 100 having a tube 50 surrounding the at least one torsion element 14, wherein an end portion of the at least one torsion element 14 is coupled to the tube 50 to prevent the end portion of the at least one torsion element 14 from rotating relative to the tube 50, wherein an opposed end portion of the at least one torsion element 14 is coupled to the cam bracket 10 to prevent the opposed end portion of the at least one torsion element 14 from rotating relative to the cam bracket 10, and wherein the opposed end portion of the at least one torsion element 14 is free to rotate relative to the tube 50.

Aspect 4: The counterbalanced system 400, 700 of any of Aspects 1-3, each of the counterbalance subassemblies 200, 300, 500 of the counterbalance assembly 100 having the cam 16 coupled to the cam bracket 10 for pivotal movement relative to the cam bracket 10 about the pivot axis and a cam follower 24 coupled to the tube, the cam follower 24 being positioned to contact the cam 16 as the first 18 and second 20 components are moved from the first position toward the second position.

Aspect 5: The counterbalanced system 400, 700 of any of Aspects 1-4, each of the counterbalance subassemblies 200, 300, 500 of the counterbalance assembly 100 being configured for adjustment of the rotational orientation of the torsion element 14 relative to the cam bracket 10.

Aspect 6: The counterbalanced system 400, 700 of any of Aspects 1-5, each of the counterbalance subassemblies 200, 300, 500 of the counterbalance assembly 100 having an adjustment screw 60 positioned to change the rotational orientation of the torsion element 14 relative to the cam bracket 10.

Aspect 7: The counterbalanced system 400, 700 according to any of Aspects 1-6, wherein the torsion element 14 comprises a wire bundle 44, 72.

Aspect 8: The counterbalanced system 400, 700 according to any of Aspects 1-7, wherein an end portion of the wire bundle 44, 72 is coupled to the tube 50.

Aspect 9: The counterbalanced system 400, 700 according to any of Aspects 1-8, wherein the opposed end portion of the wire bundle 44, 72 is coupled to the cam bracket 10 for rotational adjustment of the wire bundle 44, 72 relative to the cam bracket 10.

Aspect 10: The counterbalanced system 400, 700 according to any of Aspects 1-9, further comprising an anchor arm 56, 80 configured for rotational adjustment of the wire bundle 44, 72 relative to the cam bracket 10.

Aspect 11: The counterbalanced system 400, 700 according to any of Aspects 1-10, further comprising at least one support hinge 600 coupled to the first component 18 and the second component 20.

Aspect 12: The counterbalanced system 400, 700 according to Aspect 11, wherein the at least one support hinge 600 is a free-swing hinge.

Aspect 13: A vehicle comprising:
a frame and a hood connected to the frame to pivot about a pivot axis between an open position allowing access to a compartment and a closed position restricting access to the compartment; and
a counterbalance assembly 100, 800 coupled to the frame and the hood, the counterbalance assembly 100, 800 including a plurality of counterbalance subassemblies 200, 300, 500 each having a cam bracket 10 and a bracket 12 both secured to the frame or the hood, a cam 16 secured to the other of the hood or the frame, and at least one torsion element 14 extending between the cam bracket 10 and the bracket 12, the at least one torsion element 14 of each of the counterbalance subassemblies 200, 300, 500 extending along a common torsion axis spaced from the pivot axis;
wherein the counterbalance subassemblies 200, 300, 500 of the counterbalance assembly 100 are spaced from one another in a direction along the torsion axis, thereby defining a gap between the bracket 12 or the cam bracket 10 of one of the counterbalance subassemblies 200, 300, 500 and the bracket 12 or the cam bracket 10 of another one of the counterbalance subassemblies 200, 300, 500.

Aspect 14: The vehicle of Aspect 13, each of the counterbalance subassemblies 200, 300, 500 of the counterbalance assembly 100 having a tube 50 surrounding the at least one torsion element 14, wherein an end portion of the at least one torsion element 14 is coupled to the tube 50 to prevent the end portion of the at least one torsion element 14 from rotating relative to the tube 50, wherein an opposed end portion of the at least one torsion element 14 is coupled to the cam bracket 10 to prevent the opposed end portion of the at least one torsion element 14 from rotating relative to the cam bracket 10, and wherein the opposed end portion of the at least one torsion element 14 is free to rotate relative to the tube 50.

Aspect 15: The vehicle of Aspect 13 or Aspect 14, each of the counterbalance subassemblies 200, 300, 500 of the counterbalance assembly 100 having the cam 16 coupled to the cam bracket 10 for pivotal movement relative to the cam bracket 10 about the pivot axis and a cam follower 24 coupled to the tube 50, the cam follower 24 being positioned to contact the cam 16 as the hood is moved from the one of the open or closed positions toward the other of the open or closed position.

Aspect 16: The vehicle of any of Aspects 13-15, each of the counterbalance subassemblies 200, 300, 500 of the counterbalance assembly 100 being configured for adjustment of the rotational orientation of the torsion element 14 relative to the cam bracket 10.

Aspect 17: The vehicle of any of Aspects 13-16, each of the counterbalance subassemblies 200, 300, 500 of the counterbalance assembly 100 having an adjustment screw 60 positioned to change the rotational orientation of the torsion element 14 relative to the cam bracket 10.

Aspect 18: The vehicle of any of Aspects 13-17, wherein the torsion element 14 comprises a wire bundle 44, 72.

Aspect 19: The vehicle of any of Aspects 13-18, further comprising an inner socket 54, 82 positioned to couple the wire bundle 44, 72 to the tube 50 proximal the end portion of the torsion element 14.

Aspect 20: The vehicle of any of Aspects 13-19, further comprising an anchor arm 56, 80 positioned to couple the wire bundle 44, 72 to the cam bracket 10 proximal the opposed end portion of the torsion element 14, wherein the anchor arm 56, 80 is configured for rotational adjustment of the wire bundle 44, 72 relative to the cam bracket 10.

Aspect 21: The vehicle of any of Aspects 13-20, further comprising a screw 60 associated with the anchor arm 56, 80 and positioned to rotationally adjust the position of the wire bundle 44, 72 relative to the cam bracket 10.

Aspect 22: A counterbalanced system 400, 700 comprising:
first 18 and second 20 components connected to one another to pivot relative to one another about a pivot axis between a first position and a second position; and
a counterbalance assembly 100, 800 coupled to the first and second components, the counterbalance assembly 100 including
a counterbalance subassembly 200, 300, 500 having a cam 16 secured to the first component 18, a cam bracket 10 secured to the second component 20, and at least one torsion element 14 extending from the cam bracket 10, the at least one torsion element 14 of the counterbalance subassembly 200, 300, 500, extending along a subassembly torsion axis spaced from and parallel to the pivot axis; and
a hinge coupled to the first component 18 and to the second component 20 and having a hinge pivot axis;
wherein the counterbalance subassembly 200, 300, 500 and the hinge of the counterbalance assembly 100, 800 are spaced from one another in a direction along the subassembly torsion axis, thereby defining a gap between the at least one torsion element 14 of the counterbalance subassembly and the hinge.

Aspect 23: The counterbalanced system of Aspect 22, wherein the hinge comprises a counterbalance subassembly 200, 300, 500 having a cam 16 secured to the first component 18, a cam bracket 10 secured to the second component 20, and at least one torsion element 14 extending from the cam bracket 10, the at least one torsion element 14 of the counterbalance subassembly 200, 300, 500 of the hinge extending along the subassembly torsion axis spaced from and parallel to the pivot axis.

Aspect 24: The counterbalanced system 400, 700 of Aspect 22 or Aspect 23, the counterbalance subassembly 200, 300, 500 also having a bracket 12 secured to the second component 20, wherein the at least one torsion element 14 extends between the cam bracket 10 and the bracket 12.

Aspect 25: The counterbalanced system 400, 700 of either Aspect 22 or Aspect 24, wherein the hinge is a support hinge 600.

Aspect 26: A counterbalance assembly 100, 800 configured to be coupled to first 18 and second 20 components connected to one another to pivot relative to one another about a pivot axis between a first position and a second position, the counterbalance assembly 100, 800 comprising:
a plurality of counterbalance subassemblies 200, 300, 500 each having a cam 16 configured to be secured to the first component 18, a cam bracket 10 configured to be secured to the second component 20, a bracket 12 configured to be secured to the second component 20, and at least one torsion element 14 extending between the cam bracket 10 and the bracket 12, the at least one torsion element 14 of each of the counterbalance subassemblies 200, 300, 500 positionable to extend along a subassembly torsion axis spaced from and parallel to the pivot axis;
wherein the counterbalance subassemblies 200, 300, 500 of the counterbalance assembly 100, 800 are configured to be spaced from one another in a direction along the subassembly torsion axes, thereby defining a gap between the bracket 12 or the cam bracket 10 of one of the counterbalance subassemblies 200, 300, 500 and the bracket 12 or the cam bracket 10 of another one of the counterbalance subassemblies 200, 300, 500 when the counterbalance assembly 100, 800 are coupled to the first 18 and second 20 components.

Aspect 27: The counterbalance assembly 100, 800 of Aspect 26, wherein at least one of the plurality of counterbalance subassemblies 200, 300, 500 is a mirror image of at least another one of the plurality of counterbalance subassemblies 200, 300, 500.

Aspect 28: The counterbalance assembly 100, 800 of either Aspect 26 or Aspect 27, further comprising at least one support hinge 600.

Aspect 29: A counterbalance assembly 100, 800 configured to be coupled to first 18 and second components 20 connected to one another to pivot relative to one another about a pivot axis between a first position and a second position, the counterbalance assembly 100, 800 comprising:
  at least one counterbalance subassembly 200, 300, 500 having a cam 16 configured to be secured to the first component 18, a cam bracket 10 configured to be secured to the second component 20, a bracket 12 configured to be secured to the second component 20, and at least one torsion element 14 extending between the cam bracket 10 and the bracket 12, the at least one torsion element 14 of the at least one counterbalance subassembly 200, 300, 500 being positionable to extend along a subassembly torsion axis spaced from and parallel to the pivot axis; and
  at least one support hinge 600 coupled to the first component 18 and to the second component 20 and having a hinge pivot axis;
  wherein the at least one counterbalance subassembly 200, 300, 500 of the counterbalance assembly 100, 800 is configured to be spaced from the at least one support hinge 600 in a direction along the subassembly torsion axis, thereby defining a gap between the bracket 12 or the cam bracket 10 of the at least one counterbalance subassembly 200, 300, 500 and the at least one support hinge 600 when the at least one counterbalance assembly 100, 800 and the at least one support hinge 600 are coupled to the first 18 and second 20 components.

Aspect 30: A vehicle comprising:
  a frame and a hood connected to the frame to pivot about a pivot axis between an open position allowing access to a compartment and a closed position restricting access to the compartment;
  a counterbalance assembly 100, 800 coupled to the frame and the hood, the counterbalance assembly including at least one counterbalance subassembly 200, 300, 500 having a cam bracket 10 and a bracket 12 both secured to the frame or the hood, a cam 16 secured to the other of the hood or the frame, and at least one torsion element 14 extending between the cam bracket 10 and the bracket, the at least one torsion element 14 of the at least one counterbalance subassembly 200, 300, 500 extending along a torsion axis spaced from the pivot axis; and
  at least one support hinge 600 coupled to the frame and to the hood and having a hinge pivot axis, the hinge pivot axis being coaxial with the pivot axis and;
  wherein the at least one counterbalance subassembly 200, 300, 500 and the at least one support hinge 600 of the counterbalance assembly 100, 800 are spaced from one another in a direction along the torsion axis, thereby defining a gap between the bracket 12 or the cam bracket 10 of the at least one counterbalance subassembly 200, 300, 500 and the at least one support hinge 600.

Although the invention is illustrated and described herein with reference to specific embodiments, the invention is not intended to be limited to the details shown. Rather, various modifications may be made in the details within the scope and range of equivalents of the claims and without departing from the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A counterbalanced system comprising:
  first and second components connected to one another to pivot relative to one another about a pivot axis between a first position and a second position;
  a counterbalance assembly coupled to the first and second components, the counterbalance assembly including a plurality of counterbalance subassemblies each having a cam secured to the first component, a cam bracket secured to the second component, a bracket secured to the second component, and at least one torsion element extending between the cam bracket and the bracket, the at least one torsion element of each of the counterbalance subassemblies extending along a subassembly torsion axis spaced from and parallel to the pivot axis;
  wherein the counterbalance subassemblies of the counterbalance assembly are spaced from one another in a direction along the subassembly torsion axes, thereby defining a gap between the bracket or the cam bracket of one of the counterbalance subassemblies and the bracket or the cam bracket of another one of the counterbalance subassemblies; and
  each of the counterbalance subassemblies of the counterbalance assembly having a tube surrounding the at least one torsion element, wherein an end portion of the at least one torsion element is coupled to the tube to prevent the end portion of the at least one torsion element from rotating relative to the tube, wherein an opposed end portion of the at least one torsion element is coupled to the cam bracket to prevent the opposed end portion of the at least one torsion element from rotating relative to the cam bracket, and wherein the opposed end portion of the at least one torsion element is free to rotate relative to the tube.

2. The counterbalanced system of claim 1, each of the counterbalance subassemblies of the counterbalance assembly having the cam coupled to the cam bracket for pivotal movement relative to the cam bracket about the pivot axis and a cam follower coupled to the tube, the cam follower being positioned to contact the cam as the first and second components are moved from the first position toward the second position.

3. The counterbalanced system of claim 2, each of the counterbalance subassemblies of the counterbalance assembly being configured for adjustment of the rotational orientation of the torsion element relative to the cam bracket.

4. The counterbalanced system of claim 3, each of the counterbalance subassemblies of the counterbalance assembly having an adjustment screw positioned to change the rotational orientation of the torsion element relative to the cam bracket.

5. The counterbalanced system according to claim 1, wherein the torsion element comprises a wire bundle.

6. The counterbalanced system according to claim 5, wherein an end portion of the wire bundle is coupled to the tube.

7. The counterbalanced system according to claim 5, wherein the opposed end portion of the wire bundle is coupled to the cam bracket for rotational adjustment of the wire bundle relative to the cam bracket.

8. The counterbalanced system according to claim 7, further comprising an anchor arm configured for rotational adjustment of the wire bundle relative to the cam bracket.

9. A counterbalanced system comprising:
  first and second components connected to one another to pivot relative to one another about a pivot axis between a first position and a second position; and
  a counterbalance assembly coupled to the first and second components, the counterbalance assembly including a plurality of counterbalance subassemblies each having a cam secured to the first component, a cam bracket secured to the second component, a bracket secured to the second component, and at least one torsion element extending between the cam bracket and the bracket, the at least one torsion element of each of the counterbalance subassemblies extending along a subassembly torsion axis spaced from and parallel to the pivot axis;
  at least one support hinge coupled to the first component and the second component;
  wherein the counterbalance subassemblies of the counterbalance assembly are spaced from one another in a direction along the subassembly torsion axes, thereby defining a gap between the bracket or the cam bracket of one of the counterbalance subassemblies and the bracket or the cam bracket of another one of the counterbalance subassemblies; and
  wherein each of the counterbalance subassemblies of the counterbalance assembly further comprises an anchor arm coupled to an end portion of the torsion element, the anchor arm being configured for rotational adjustment of the rotational orientation of the torsion element relative to the cam bracket and wherein each of the counterbalance subassemblies of the counterbalance assembly has an adjustment screw associated with the anchor arm, the screw being configured to change the rotational orientation of the torsion element relative to the cam bracket.

10. The counterbalanced system according to claim 9, wherein the at least one support hinge is a free-swing hinge.

11. A vehicle comprising:
  a frame and a hood connected to the frame to pivot about a pivot axis between an open position allowing access to a compartment and a closed position restricting access to the compartment; and
  a counterbalance assembly coupled to the frame and the hood, the counterbalance assembly including a plurality of counterbalance subassemblies each having a cam bracket and a bracket both secured to the frame or the hood, a cam secured to the other of the hood or the frame, and at least one torsion element extending between the cam bracket and the bracket, the at least one torsion element of each of the counterbalance subassemblies extending along a common torsion axis spaced from the pivot axis;
  wherein the counterbalance subassemblies of the counterbalance assembly are spaced from one another in a direction along the torsion axis, thereby defining a gap between the bracket or the cam bracket of one of the counterbalance subassemblies and the bracket or the cam bracket of another one of the counterbalance subassemblies; and
  each of the counterbalance subassemblies of the counterbalance assembly having a tube surrounding the at least one torsion element, wherein an end portion of the at least one torsion element is coupled to the tube to prevent the end portion of the at least one torsion element from rotating relative to the tube, wherein an opposed end portion of the at least one torsion element is coupled to the cam bracket to prevent the opposed end portion of the at least one torsion element from rotating relative to the cam bracket, and wherein the opposed end portion of the at least one torsion element is free to rotate relative to the tube.

12. The vehicle of claim 11, each of the counterbalance subassemblies of the counterbalance assembly having the cam coupled to the cam bracket for pivotal movement relative to the cam bracket about the pivot axis and a cam follower coupled to the tube, the cam follower being positioned to contact the cam as the hood is moved from the open or closed position toward the other of the open or closed position.

13. The vehicle of claim 12, each of the counterbalance subassemblies of the counterbalance assembly being configured for adjustment of the rotational orientation of the torsion element relative to the cam bracket.

14. The vehicle of claim 13, each of the counterbalance subassemblies of the counterbalance assembly having an adjustment screw positioned to change the rotational orientation of the torsion element relative to the cam bracket.

15. The vehicle of claim 11, wherein the torsion element comprises a wire bundle.

16. The vehicle of claim 15, further comprising an inner socket positioned to couple the wire bundle to the tube proximal the end portion of the torsion element.

17. The vehicle of claim 15, further comprising an anchor arm positioned to couple the wire bundle to the cam bracket proximal the opposed end portion of the torsion element, wherein the anchor arm is configured for rotational adjustment of the wire bundle relative to the cam bracket.

18. A vehicle comprising:
  a frame and a hood connected to the frame to pivot about a pivot axis between an open position allowing access to a compartment and a closed position restricting access to the compartment; and
  a counterbalance assembly coupled to the frame and the hood, the counterbalance assembly including a plurality of counterbalance subassemblies each having a cam bracket and a bracket both secured to the frame or the hood, a cam secured to the other of the hood or the frame, and at least one torsion element extending between the cam bracket and the bracket, the at least one torsion element of each of the counterbalance subassemblies extending along a common torsion axis spaced from the pivot axis, and the at least one torsion element comprises a wire bundle;
  wherein the counterbalance subassemblies of the counterbalance assembly are spaced from one another in a direction along the torsion axis, thereby defining a gap between the bracket or the cam bracket of one of the counterbalance subassemblies and the bracket or the cam bracket of another one of the counterbalance subassemblies; and each of the counterbalance subassemblies of the counterbalance assembly having a tube surrounding the at least one torsion element, wherein an end portion of the at least one torsion element is coupled to the tube to prevent the end portion of the at least one torsion element from rotating relative to the tube, wherein an opposed end portion of the at least one torsion element is coupled to the cam bracket to prevent the opposed end portion of the at least one torsion element from rotating relative to the cam bracket, and wherein the opposed end portion of the at least one torsion element is free to rotate relative to the tube;

an anchor arm is positioned to couple the wire bundle to the cam bracket proximal the opposed end portion of the torsion element, wherein the anchor arm is configured for rotational adjustment of the wire bundle relative to the cam bracket, and a screw is associated with the anchor arm and positioned to rotationally adjust the position of the wire bundle relative to the cam bracket.

19. A counterbalanced system comprising:

first and second components connected to one another to pivot relative to one another about a pivot axis between a first position and a second position; and a counterbalance assembly coupled to the first and second components, the counterbalance assembly including a counterbalance subassembly having a cam secured to the first component, a cam bracket secured to the second component, and at least one torsion element extending from the cam bracket, the at least one torsion element of the counterbalance subassembly extending along a subassembly torsion axis spaced from and parallel to the pivot axis; and a hinge coupled to the first component and to the second component and having a hinge pivot axis;

wherein the counterbalance subassembly and the hinge of the counterbalance assembly are spaced from one another in a direction along the subassembly torsion axis, thereby defining a gap between the at least one torsion element of the counterbalance subassembly and the hinge; and wherein each of the counterbalance subassemblies of the counterbalance assembly further comprises an anchor arm coupled to an end portion of the torsion element, the anchor arm being configured for rotational adjustment of the rotational orientation of the torsion element relative to the cam bracket and wherein each of the counterbalance subassemblies of the counterbalance assembly has an adjustment screw associated with the anchor arm, the screw being positioned perpendicular to the torsion axis and configured to change the rotational orientation of the torsion element relative to the cam bracket.

20. The counterbalanced system of claim 19, wherein the hinge comprises a counterbalance subassembly having a cam secured to the first component, a cam bracket secured to the second component, and at least one torsion element extending from the cam bracket, the at least one torsion element of the counterbalance subassembly of the hinge extending along the subassembly torsion axis spaced from and parallel to the pivot axis.

21. The counterbalanced system of claim 19, the counterbalance subassembly also having a bracket secured to the second component, wherein the at least one torsion element extends between the cam bracket and the bracket.

22. The counterbalanced system of claim 19, wherein the hinge is a support hinge.

23. A counterbalance assembly configured to be coupled to first and second components connected to one another to pivot relative to one another about a pivot axis between a first position and a second position, the counterbalance assembly comprising:

a plurality of counterbalance subassemblies each having a cam configured to be secured to the first component, a cam bracket configured to be secured to the second component, a bracket configured to be secured to the second component, and at least one torsion element extending between the cam bracket and the bracket, the at least one torsion element of each of the counterbalance subassemblies positionable to extend along a subassembly torsion axis spaced from and parallel to the pivot axis;

wherein the counterbalance subassemblies of the counterbalance assembly are configured to be spaced from one another in a direction along the subassembly torsion axes, thereby defining a gap between the bracket or the cam bracket of one of the counterbalance subassemblies and the bracket or the cam bracket of another one of the counterbalance subassemblies when the counterbalance assembly is coupled to the first and second components; and wherein each of the counterbalance subassemblies of the counterbalance assembly further comprises an anchor arm coupled to an end portion of the torsion element, the anchor arm being configured for rotational adjustment of the rotational orientation of the torsion element relative to the cam bracket and wherein each of the counterbalance subassemblies of the counterbalance assembly has an adjustment screw associated with the anchor arm, the screw being positioned perpendicular to the torsion axis and configured to change the rotational orientation of the torsion element relative to the cam bracket.

24. The counterbalance assembly of claim 23, wherein at least one of the plurality of counterbalance subassemblies is a mirror image of at least another one of the plurality of counterbalance subassemblies.

25. The counterbalance assembly of claim 23, further comprising at least one support hinge.

26. A counterbalance assembly configured to be coupled to first and second components connected to one another to pivot relative to one another about a pivot axis between a first position and a second position, the counterbalance assembly comprising:

at least one counterbalance subassembly having a cam configured to be secured to the first component, a cam bracket configured to be secured to the second component, a bracket configured to be secured to the second component, and at least one torsion element extending between the cam bracket and the bracket, the at least one torsion element of the at least one counterbalance subassembly being positionable to extend along a subassembly torsion axis spaced from and parallel to the pivot axis; and at least one support hinge coupled to the first component and to the second component and having a hinge pivot axis;

wherein the at least one counterbalance subassembly of the counterbalance assembly is configured to be spaced from the at least one support hinge in a direction along the subassembly torsion axis, thereby defining a gap between the bracket or the cam bracket of the at least one counterbalance subassembly and the at least one support hinge when the counterbalance assembly and the at least one support hinge are coupled to the first and second components; and wherein each of the counterbalance subassemblies of the counterbalance assembly further comprises an anchor arm coupled to an end portion of the torsion element, the anchor arm being configured for rotational adjustment of the rotational orientation of the torsion element relative to the cam bracket and wherein each of the counterbalance subassemblies of the counterbalance assembly has an adjustment screw associated with the anchor arm, the screw being positioned perpendicular to the torsion axis and configured to change the rotational orientation of the torsion element relative to the cam bracket.

27. A vehicle comprising:

a frame and a hood connected to the frame to pivot about a pivot axis between an open position allowing access to a compartment and a closed position restricting access to the compartment;

a counterbalance assembly coupled to the frame and the hood, the counterbalance assembly including at least one counterbalance subassembly having a cam bracket and a bracket both secured to the frame or the hood, a cam secured to the other of the hood or the frame, and at least one torsion element extending between the cam bracket and the bracket, the at least one torsion element of the at least one counterbalance subassembly extending along a torsion axis spaced from the pivot axis; and at least one support hinge coupled to the frame and to the hood and having a hinge pivot axis, the hinge pivot axis being coaxial with the pivot axis;

wherein the at least one counterbalance subassembly and the at least one support hinge of the counterbalance assembly are spaced from one another in a direction along the torsion axis, thereby defining a gap between the bracket or the cam bracket of the at least one counterbalance subassembly and the at least one support hinge; and wherein each of the counterbalance subassemblies of the counterbalance assembly further comprises an anchor arm coupled to an end portion of the torsion element, the anchor arm being configured for rotational adjustment of the rotational orientation of the torsion element relative to the cam bracket and wherein each of the counterbalance subassemblies of the counterbalance assembly has an adjustment screw associated with the anchor arm, the screw being positioned perpendicular to the torsion axis and configured to change the rotational orientation of the torsion element relative to the cam bracket.

* * * * *